United States Patent
Sato et al.

(10) Patent No.: US 12,515,695 B2
(45) Date of Patent: Jan. 6, 2026

(54) VEHICLE CONTROL DEVICE, VEHICLE CONTROL METHOD, TARGET TRAJECTORY CALCULATION METHOD, AND VEHICLE

(71) Applicants: Hitachi Astemo, Ltd., Hitachinaka (JP); School Judicial Person Ikutoku Gakuen, Atsugi (JP)

(72) Inventors: Yu Sato, Hitachinaka (JP); Makoto Yamakado, Atsugi (JP); Masato Abe, Atsugi (JP); Yoshio Kano, Atsugi (JP); Yusuke Tanaka, Atsugi (JP)

(73) Assignees: Hitachi Astemo, Ltd., Hitachinaka (JP); School Judicial Person Ikutoku Gakuen, Atsugi (JP)

( * ) Notice: Subject to any disclaimer, the term of this patent is extended or adjusted under 35 U.S.C. 154(b) by 122 days.

(21) Appl. No.: 18/281,238

(22) PCT Filed: Feb. 25, 2022

(86) PCT No.: PCT/JP2022/007969
§ 371 (c)(1),
(2) Date: Sep. 8, 2023

(87) PCT Pub. No.: WO2022/190910
PCT Pub. Date: Sep. 15, 2022

(65) Prior Publication Data
US 2024/0294185 A1 Sep. 5, 2024

(30) Foreign Application Priority Data
Mar. 11, 2021 (JP) .................................. 2021-039029

(51) Int. Cl.
*B60W 60/00* (2020.01)

(52) U.S. Cl.
CPC ....... *B60W 60/001* (2020.02); *B60W 2520/14* (2013.01); *B60W 2720/14* (2013.01)

(58) Field of Classification Search
CPC .......... B60W 60/001; B60W 2520/14; B60W 2720/14; B60W 2552/30;
(Continued)

(56) References Cited

U.S. PATENT DOCUMENTS

| | | | |
|---|---|---|---|
| 10,379,538 B1 * | 8/2019 | Sheckells | G05D 1/0217 |
| 10,671,075 B1 * | 6/2020 | Kobilarov | G05D 1/0088 |

(Continued)

FOREIGN PATENT DOCUMENTS

| | | |
|---|---|---|
| JP | 2011-203240 A | 10/2011 |
| JP | 2014-218098 A | 11/2014 |
| JP | 2019-189187 | 10/2019 |

OTHER PUBLICATIONS

Extended European Search Report issued in European Application No. 22766869.6 dated Aug. 5, 2024 (9 pages).

(Continued)

*Primary Examiner* — Jason Holloway
*Assistant Examiner* — Madison B Emmett
(74) *Attorney, Agent, or Firm* — Crowell & Moring LLP

(57) ABSTRACT

In an aspect of a vehicle control device, a vehicle control method, a target trajectory calculation method, and a vehicle according to the present invention, an offset amount of a coordinate value or a curvature is determined for each item of basic trajectory coordinate data on a basis of the basic trajectory coordinate data on at least a part or all of a two-dimensional coordinate value, a trajectory curvature, and a trajectory azimuth angle at coordinates arranged in ascending order of arc length from a certain position serving as an origin point, new target trajectory coordinate data is determined by adding the offset amount to each item of the (Continued)

basic trajectory coordinate data, and a trajectory of a vehicle is controlled on a basis of the new target trajectory coordinate data. Thus, a target trajectory with an out-in-out line can be obtained as in steering by an expert driver.

5 Claims, 16 Drawing Sheets

(58) Field of Classification Search
CPC ......... B60W 2720/103; B60W 30/045; B60W 30/18145; B60W 60/0013; B62D 15/025
See application file for complete search history.

(56) References Cited

U.S. PATENT DOCUMENTS

| | | | |
|---|---|---|---|
| 12,077,181 B1* | 9/2024 | Costantino | B60W 60/0011 |
| 2006/0287817 A1* | 12/2006 | Nagel | B60W 50/14 |
| | | | 701/507 |
| 2011/0218724 A1 | 9/2011 | Iida | |
| 2013/0006473 A1 | 1/2013 | Buerkle et al. | |
| 2015/0294571 A1* | 10/2015 | Shida | G01C 21/26 |
| | | | 701/409 |
| 2016/0052547 A1 | 2/2016 | Kashiwai | |
| 2017/0057544 A1* | 3/2017 | Matsuno | B62D 15/021 |
| 2020/0307685 A1 | 10/2020 | Akiyama et al. | |
| 2020/0341476 A1* | 10/2020 | Wuthishuwong | G08G 1/167 |
| 2021/0373566 A1* | 12/2021 | Agarwal | B60W 30/18145 |
| 2023/0391325 A1* | 12/2023 | Tsuchiya | B60W 30/12 |

OTHER PUBLICATIONS

International Search Report (PCT/ISA/210) issued in PCT Application No. PCT/JP2022/007969 dated Apr. 12, 2022 with English translation (4 pages).

Japanese-language Written Opinion (PCT/ISA/237) issued in PCT Application No. PCT/JP2022/007969 dated Apr. 12, 2022 with English translation (7 pages).

Ono et al., "On Calculations of Curvature of Sampled Curves", The Institute of Image Information and Television Engineers, 1993, vol. 17, No. 76, pp. 7-14 (20 pages).

International Preliminary Report on Patentability (PCT/IB/338 & PCT/IB/373) issued in PCT Application No. PCT/JP2022/007969 dated Sep. 21, 2023, including English translation of (Japanese-language Written Opinion (PCT/ISA/237) filed on Sep. 8, 2023) (12 pages).

* cited by examiner

| PHASE | CURVE APPROACH | DURING CURVE | OUT OF CURVE |
|---|---|---|---|
| LATERAL JERK: Jy | POSITIVE (LEFT TURN) | ZERO | NEGATIVE (LEFT TURN) |
| | NEGATIVE (RIGHT TURN) | | POSITIVE (RIGHT TURN) |
| CHANGE OF CURVATURE: $d\kappa/ds$ | POSITIVE (LEFT TURN) | ZERO | NEGATIVE (LEFT TURN) |
| | NEGATIVE (RIGHT TURN) | | POSITIVE (RIGHT TURN) |

$$G_{xt\_pv} = -\frac{C_{xy\_pv}}{1+T_{pv}s} \dot{\kappa}_{pv} \cdot V^2$$

$$G_{xt\_GVC} = -\frac{C_{xy}}{1+T_s} |\dot{G}_y|$$

RESULTANT COMMAND $G_{xt\_PGVC}$

"g-g" DIAGRAM

FIG.12A

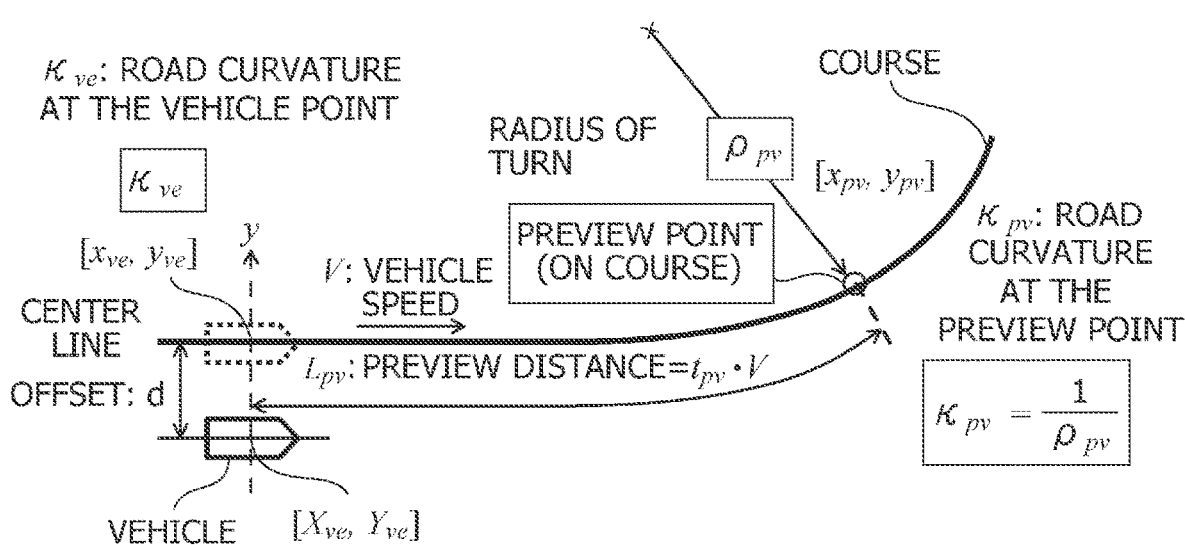

FIG.12B

<EXAMPLE OF CENTER-LINE-WAYPOINT DATA>

| i | X-POSITION ON CENTER LINE $X(i)$ | Y-POSITION ON CENTER LINE $y(i)$ | CURVATURE ON CENTER LINE $\kappa(i)$ | CURVATURE RATE ON CENTER LINE $d\kappa(i)/ds$ | DIRECTION OF CENTER LINE $\theta(i)$ |
|---|---|---|---|---|---|
| 1 | 0 | 0 | 0 | 0 | 0 |
| ⋮ | ⋮ | ⋮ | ⋮ | ⋮ | ⋮ |
| $ve$ | $x_{ve}$ | $y_{ve}$ | $\kappa_{ve}$ | $d\kappa_{ve}/ds$ | $\theta_{ve}$ |
| ⋮ | ⋮ | ⋮ | ⋮ | ⋮ | ⋮ |
| $pv$ | $x_{pv}$ | $y_{pv}$ | $\kappa_{pv}$ | $d\kappa_{pv}/ds$ | $\theta_{pv}$ |
| ⋮ | ⋮ | ⋮ | ⋮ | ⋮ | ⋮ |
| $N$ | $X(N)$ | $Y(N)$ | $\kappa(N)$ | $d\kappa/ds(N)$ | $\theta(N)$ |

VEHICLE CONTROL DEVICE, VEHICLE CONTROL METHOD, TARGET TRAJECTORY CALCULATION METHOD, AND VEHICLE

TECHNICAL FIELD

The present invention relates to a vehicle control device, a vehicle control method, a target trajectory calculation method, and a vehicle.

BACKGROUND ART

A road shape learning device disclosed in Patent Document 1 extracts, when determining that a vehicle has passed through a curve, entrance coordinates, center coordinates, and exit coordinates that are information on vehicle positions corresponding to the entrance, the center, and the exit of the curve, determines corrected entrance coordinates, corrected center coordinates, and corrected exit coordinates that are obtained by correcting the entrance coordinates, the center coordinates, and the exit coordinates by a correction value corresponding to predetermined traveling tendency, calculates the radius of an arc passing through points at the corrected entrance coordinates, the corrected center coordinates, and the corrected exit coordinates, and sets the radius as a radius of curvature at the curve.

Furthermore, the road shape learning device of Patent Document 1 sets a correction value for each curving direction according to out-in-out traveling tendency, thereby enabling easily learning the shape of a road without complicated processing.

REFERENCE DOCUMENT LIST

Patent Document

Patent Document 1: JP 2011-203240 A

SUMMARY OF THE INVENTION

Problem to be Solved by the Invention

However, rules for correspondence between a road shape and an out-in-out line are conventionally indefinite. In the case of vehicle motion control for driving a vehicle along a target trajectory, the target trajectory may fail to be obtained with an out-in-out line as in steering by an expert driver.

The present invention has been devised in view of these conventional circumstances. An object of the present invention is to provide a vehicle control device, a vehicle control method, a target trajectory calculation method, and a vehicle, by which a target trajectory can be obtained with an out-in-out line as in steering by an expert driver.

Means for Solving the Problem

According to the present invention, in an aspect thereof, a vehicle control device determines an offset amount of a coordinate value or a curvature for each item of basic trajectory coordinate data on a basis of the basic trajectory coordinate data on at least a part or all of a two-dimensional coordinate value, a trajectory curvature, and a trajectory azimuth angle at coordinates arranged in ascending order of arc length from a certain position serving as an origin point, determines new target trajectory coordinate data by adding the offset amount to each item of the basic trajectory coordinate data, and controls a trajectory of a vehicle on a basis of the new target trajectory coordinate data.

Effects of the Invention

According to the present invention, it is possible to obtain a target trajectory with an out-in-out line as in steering by an expert driver.

BRIEF DESCRIPTION OF THE DRAWINGS

FIG. 12A is a diagram showing an offset at a left curve and an offset from the position of a vehicle before approach into the left curve.

FIG. 12B is a diagram showing an offset at a left curve and waypoint data on a lane center line.

MODE FOR CARRYING OUT THE INVENTION

Figure 1:
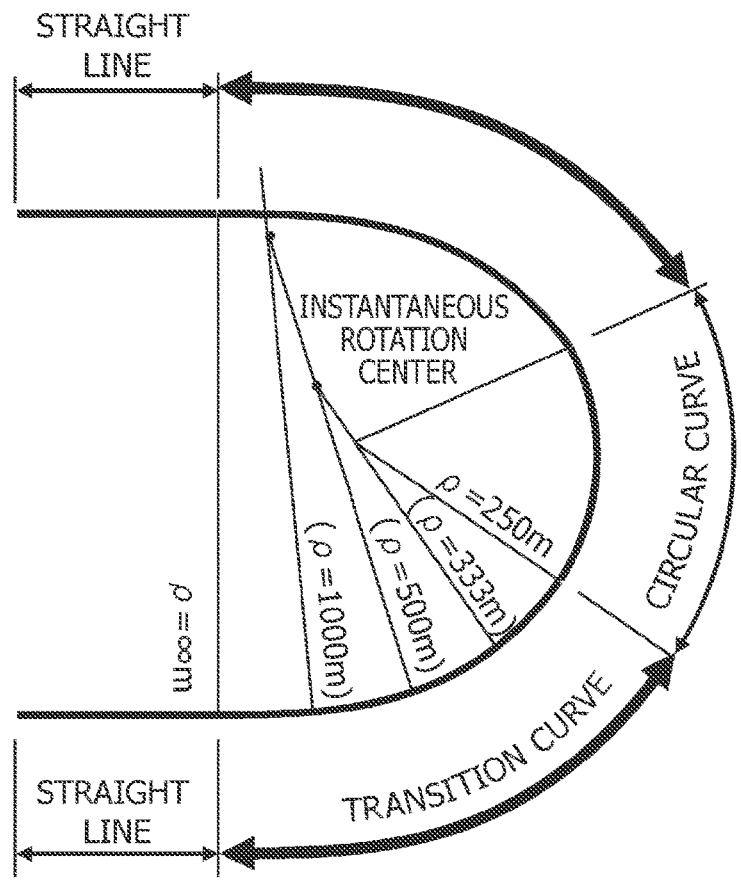
FIG. 1 is an explanatory drawing of a transition curve.

A vehicle control device, a vehicle control method, a target trajectory calculation method, and a vehicle according to the present invention will be described below.

The present invention has the function of continuously calculating a target trajectory offset from the center of a lane or the center of a driving area, more specifically, a target trajectory with an out-in-out line as in steering by an expert driver during autonomous driving of a vehicle.

Autonomous driving has been actively studied in recent years. Proposed subjects include an autonomous vehicle with an AI for learning "collision avoidance," the development of a danger prediction algorithm with look-ahead driving, the implementation of danger prediction intelligence equivalent to or better than an expert driver, and the implementation of comfortable automatic driving using danger prediction intelligence.

Various demonstrations of automatic driving have been performed on public roads, but the tests are still of techniques for continuously driving at the center of a lane on the basis of sensor information.

As a technique to distinguish autonomous vehicles, ride comfort is desired to be improved.

Here, the ride comfort means not the ride comfort with respect to vertical vibration due to uneven road surface but means the ride comfort with respect to vehicle motions that are generated by a driving operation that has been conventionally performed by a driver. Thus, realizing vehicle motions generated at the time of driving by an expert driver can be regarded as comfortable autonomous driving.

However, even if a driver model for determining the steering angle of an autonomous vehicle is set at an expert driver model in order to achieve smooth and natural driving of an expert driver, ride comfort does not always improve.

A lateral acceleration of a vehicle cornering at a certain speed is determined by a vehicle trajectory, and a longitudinal acceleration of the vehicle is determined by an acceleration and deceleration command. A rolling motion and a pitching motion, which are vehicle body sprung attitudes, are generated accordingly.

Since a composite of the motions determines ride comfort, driving at the center of a lane at the same speed results in substantially uniform ride comfort.

An ideal target trajectory in an acceptable range and a speed at the target trajectory are determined by a road shape, specifically, the width of a road and coordinates at the center of a lane, thereby enabling improved ride comfort. Driving at coordinates at the center of a lane (in other words, a lane center line) is not always ideal.

However, for the setting of the target trajectory, only an AI learning method is adopted at present by using big data to be stored as map data.

For example, as described above, JP 2011-203240 A discloses a road shape learning device that sets a correction value for each curving direction according to out-in-out traveling tendency, thereby enabling easily learning of the shape of a road without complicated processing.

Moreover, J P 2014-218098 A discloses a driving assistance device including a driving area detector that detects a driving area of a vehicle, a driving controller that controls a trajectory on the basis of a target trajectory generated such that the vehicle travels in the driving area detected by the driving area detector, and a controller that generates the target trajectory.

In this configuration, in the presence of a curve ahead of the vehicle in the traveling direction, the controller determines, as a reference point, the center of a road at the curve located ahead of the position of the vehicle in the traveling direction by a predicted distance that is set according to the vehicle speed of the vehicle.

Furthermore, the controller determines, as a target point, a position that is offset from the reference point to the inside of the curve by a lateral displacement set according to the radius of curvature of the curve at the reference point, and then the controller generates the target trajectory such that the vehicle passes the position of the vehicle and the target point.

JP 2019-189187 A discloses a driving trajectory designing method and a vehicle motion control device, by which a route is generated just like an expert driver.

According the driving trajectory designing method and the vehicle motion control device, a curvature κ is changed in an increasing direction when a traveling speed V for a transition curve length decreases or a time t (V=s/t) for traveling for a unit transition curve length s increases, whereas the curvature κ is changed in the increasing direction when the traveling speed V for the transition curve length increases or the time t for traveling for the unit transition curve length s decreases.

JP 2011-203240 A discloses a method of updating map data from actual driving trajectory data. However, an actual driving trajectory is dependent on the steering operation of a driver and is not always suitable for improving ride comfort.

JP 2011-203240 A also discloses that a correction value is set for each curving direction according to out-in-out traveling tendency; however, a specific definition for out-in-out is indefinite and a specific calculation method for determining it is indefinite.

The driving assistance device of JP 2014-218098 A determines, as a reference point, the center of a road at a curve located ahead of the position of the vehicle in the traveling direction and sets, as a target point, a position that is offset from the reference point to the inside of the curve by a lateral displacement set according to the radius of curvature of the curve at the reference point.

However, in the method of setting the target point, the target point is not offset to the outside of the curve, that is, in the outer direction, so that an out-in-out theory cannot be achieved.

In the driving trajectory designing method of 2019-189187 A, a transition curve can be set with acceleration and deceleration, but target trajectory data cannot be calculated such that a vehicle enters a curve from the outside instead of the center of a lane with respect to the width of a road as in actual driving by an expert driver.

Thus, an object of the present invention is to obtain a target trajectory with an out-in-out line by calculating an offset from the center of a lane according to coordinates at the center of a lane, e.g., coordinate point information at the center of the lane, and adding or subtracting the offset to or from a median value. Another object of the present invention is to improve the ride comfort and maneuverability of an autonomous vehicle traveling along the target trajectory.

Thus, in an aspect of a target trajectory calculation method according to the present invention, an offset amount from a lane center line with respect to a certain point is calculated on the basis of a difference between a curvature at the certain point and a curvature at a point located ahead by using center-line coordinate point data indicating the center of a driving lane or the center of a driving area, the center-line coordinate point data being based on stored or measured results, and a target trajectory offset from center line coordinates is continuously calculated.

Specifically, in the presence of a curve at a preview point set ahead of a current lane center point (hereinafter referred to as a ve point) by a distance $L_{pv}$ [m] on a course, an offset amount is obtained by dividing a difference between a curvature $\kappa_{pv}$ at the preview point and a curvature $\kappa_{ve}$ at the current lane center point by a distance $L_{pv}$ and multiplying the result of the division by at least a traveling speed V and a gain $C_{o0}$.

Moreover, a position displaced from a lane center line at an origin point (O point) in a direction opposite to the rotation center of a curve (in other words, outward) or in a direction to the rotation center of the curve (in other words, inward) is set as a target position (in other words, a target trajectory or a target point).

A distance $L_{pv}$ to the preview point is provided as the product of a vehicle speed V and a preview time $t_{pv}$.

According to the target trajectory calculation method, a target trajectory shifted outward and a target trajectory shifted inward can be calculated according to a change in the curvature of a curve before a vehicle enters the curve, and the vehicle is controlled to travel along the target trajectory, thereby enabling achieving the effect of, for example, improving safety and ride comfort like in driving by an expert driver.

Route generation in the present invention is not geometric route generation fixed at an absolute coordinate system in a road design or the like, that is, a macro route from a movement from A point to B point. The present invention sets a traveling line with a certain degree of freedom in the width of a road as in autonomous driving and provides a variable route in a movement to the same position.

Prior to the description of embodiments according to the present invention, the following will be discussed.

(1) Transition curve and out-in-out
(2) Acceleration and deceleration control (G-Vectoring) in relation to a lateral motion
(3) G-Vectoring control and Preview G-Vectoring control in which automatic deceleration control is exerted before approach into a curve In the following description, when the center of gravity of a vehicle serves as an origin point, the longitudinal direction of the vehicle is denoted as x, and a direction perpendicular to the x direction (in other words, the lateral direction of the vehicle) is denoted as y, an acceleration in the x direction is a longitudinal acceleration and an acceleration in the y direction is a lateral acceleration.

When the forward direction of the vehicle is positive, that is, the vehicle travels forward, a longitudinal acceleration that increases the speed of the vehicle is set to be positive.

When the vehicle travels forward, a lateral acceleration generated in a turn to the left (in other words, counterclockwise) is set to be positive, whereas a turn in the opposite direction is set to be negative.

Furthermore, on a traveling route, the radius of turn to the left is positive, the radius of turn to the right is negative, and the inverse of the radius of turn serves as a curvature. Likewise, on a target trajectory, the radius of turn to the left is positive, the radius of turn to the right is negative, and the inverse of the radius of turn serves as a curvature.

(1) Transition Curve and Out-In-Out

When a vehicle directly moves into a curved section from a linear section, ride comfort and safety may be adversely affected by, for example, the need for a rapid steering operation or a large and abrupt centrifugal force (or lateral acceleration). Thus, a rapid movement into a curved section having a small radius of curvature may result in a significant impact.

To address the problem, in some cases, a transition curve that gradually changes from a straight line to a curvature of a predetermined circular curve is inserted into a route alignment.

FIG. 1 shows an example of connection between a linear section and a circular curve section via a transition curve section. In FIG. 1, a radius ρ of the circular curve section is 250 m.

However, an actual lane has a road width in the lateral direction with respect to a curve serving as a lane center line in FIG. 1. Moreover, a radius ρ [m] of the linear section can be assumed to be infinite.

In this case, the radius of turn gradually decreases along the section of the transition curve and gradually diminishes to the radius ρ (ρ=250 m) of the circular curve section.

A curvature κ [1/m] is the inverse of a turning radius ρ [m] as represented in Equation 1.

$$\kappa = \frac{1}{\rho} \qquad \text{Equation 1}$$

Therefore, when the turning radius ρ gradually decreases along the transition curve section, the curvature κ gradually increases.

In a road design or a railway design, the curvature κ is expressed by an arc length parameter s [m] indicating a unit length.

Figure 2:
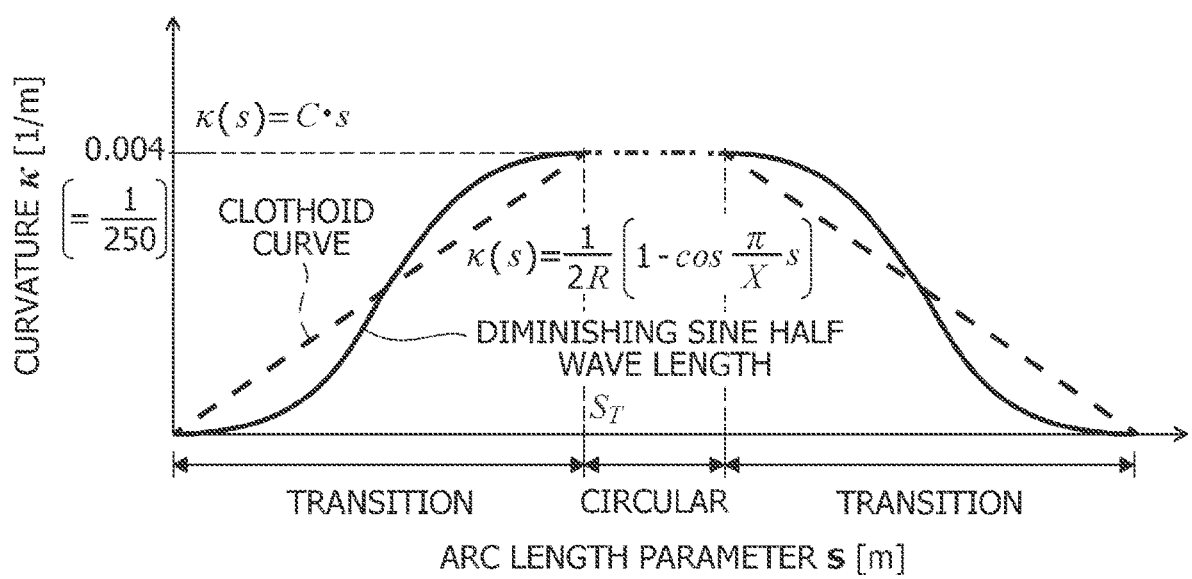
FIG. 2 is a diagram showing the relationship between an arc length parameter and a curvature.

FIG. 2 shows a correlation between the arc length parameter s and the curvature κ. The curvature κ of the transition curve increases with the arc length parameter s to a fixed curvature, that is, a steady circle at approach into a curve and then decreases at the exit of the curve.

In FIG. 2, the curvature κ reaches 0.004 (0.004=1/250) during traveling to a transition curve length ST.

Moreover, FIG. 2 shows two types of transition curves: a clothoid curve and a diminishing sine half wavelength tangent curve.

"Clothoid Curve"

In the clothoid curve, the curvature κ linearly increases relative to an arc length parameter s. Thus, the curvature κ can be represented as Equation 2.

$$\kappa(s) = C \cdot s, \qquad \text{Equation 2}$$

where C is a clothoid coefficient.

In this case, the clothoid curve is equivalent to a trajectory when a driver turns a steering wheel at a constant speed during traveling of a vehicle at a constant speed.

The clothoid coefficient C is determined when a road shape is designed. In the case of a clothoid curve, a lateral jerk is fixed.

"Diminishing Sine Half Wavelength Tangent Curve"

The diminishing sine half wavelength tangent curve increases in curvature with a half wavelength in a sinusoidal shape with respect to the arc length parameter s. When a connection is finally made to an arc with a radius R, the curvature κ can be represented as Equation 3 where X is a transition curve length.

$$\kappa(s) = \frac{1}{2R}\left(1 - \cos\frac{\pi}{X}s\right) \quad \text{Equation 3}$$

It is assumed that a vehicle travels at a constant speed (V=V0) along a transition curve with the transition curve length $S_T$.

In this case, the vehicle enters a steady turning state after a time $t_{TVC}$ when V0×$t_{TVC}$=$S_T$ is satisfied.

A vehicle lateral acceleration $G_{yVC}$ at this point can be represented as Equation 4.

$$G_{yVC} = \kappa V_0^2 (= 0.004 V_0^2) \quad \text{Equation 4}$$

A vehicle lateral jerk $J_{yVC}$ during transition curve traveling can be represented as Equation 5.

$$J_{yVC} = \frac{dG_{yVC}}{dt} = V_0^2 \frac{d\kappa(s)}{dt} = V_0^2 \frac{ds}{dt}\frac{d\kappa(s)}{ds} = V_0^3 \frac{d\kappa(s)}{ds} \quad \text{Equation 5}$$

In this case, it is assumed that a traveling speed V is kept at a speed V0. Thus, the arc length parameters that increases in one second is V0 and the vehicle lateral jerk $J_{yVC}$ is a value obtained by multiplying the cube of the speed V0 by a coefficient obtained by differentiating the curvature κ by a transition curve length.

When the curvature κ does not increase with respect to the arc length parameter s, the vehicle at a constant lateral jerk reaches the lateral acceleration of Equation 4.

When the vehicle exits from a curve, the vehicle shifts from a turning motion to a linear motion, so that the curvature κ decreases with respect to the arc length parameter s and the sign of the lateral jerk is inverted.

The curvature κ in the present invention is a signed curvature that is positive at a left curve and is negative at a right curve.

Figures 3, 4:
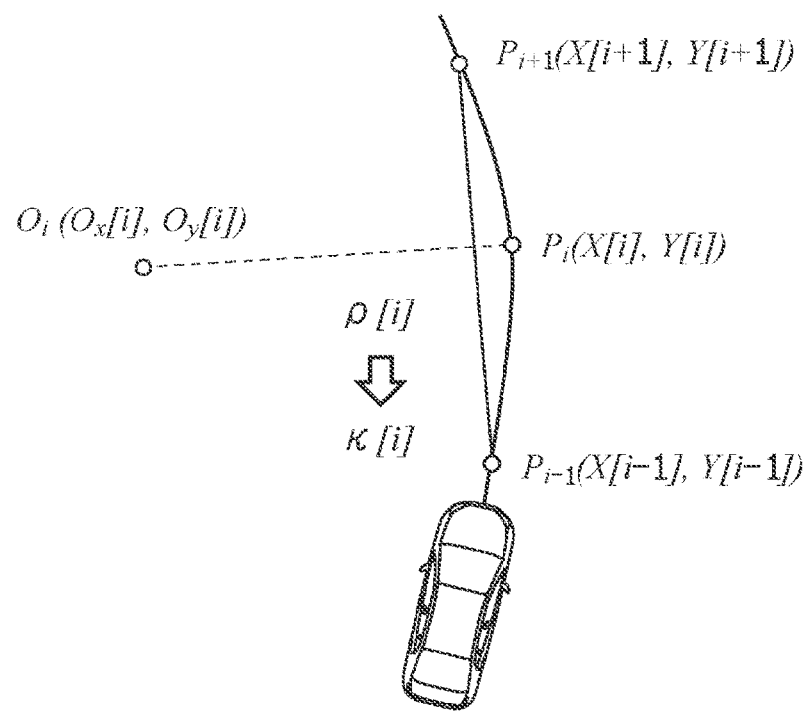
FIG. 3 is a diagram showing a correlation between a lateral jerk of a vehicle and a rate of change of curvature, and curve approach and exit.
FIG. 4 is an explanatory drawing of a curvature when data on a lane center line ahead of the vehicle is known data.

FIG. 3 shows positive and negative rates of change in lateral jerk and curvature during curve approach, curving, and exit out of a curve, for a left curve and a right curve.

For example, when a vehicle approaches a left curve with a positive lateral jerk, the lateral jerk becomes negative at the exit out of the curve.

Moreover, a rate of change in the curvature κ is positive when the vehicle approaches, for example, a left curve, whereas a rate of change in the curvature κ is negative when the vehicle exits out of the curve.

In other words, positive and negative rates of change in lateral jerk and curvature are indexes indicating curve approach and exit out of a curve. For example, during traveling at a left curve, positive rates of change in lateral jerk and curvature indicate curve approach, whereas negative rates of change indicate exit out of the curve.

Therefore, a vehicle control device that controls autonomous driving of a vehicle can recognize curve approach and exit out of a curve by acquiring a measured value of a lateral jerk and the like. However, a curvature of a lane ahead of a vehicle can be predicted and calculated by holding curvature information or coordinate information on the lane ahead of the vehicle.

FIG. 4 shows a predictive calculation of a curvature when data on a lane center line ahead of a vehicle is known data.

Referring to Document 1 ("On Calculations of Curvature of Sampled Curves", Naoki, ONO, Ryuzo TAKIYAMA, ITE technical report, 1993 volume 17, issue 76), it is assumed that XY plane coordinates are expressed by a series of N sample points (X(i), Y(i)) (i=1, . . . , N).

For point series data, a distance between sample points is 1 as indicated by Equation 6.

$$\sqrt{(X[i+1] - X[i+1])^2 + (Y[i+1] - Y[i+1])^2} = 1 \quad \text{Equation 6}$$

$$i = 1, \ldots, N-1$$

Thus, Equation 7 is determined by these values.

$$X'[i] = X[i] - X[i-1], Y'[i] = Y[i] - Y[i-1] \quad \text{Equation 7}$$

$$\Rightarrow X''[i] = X'[i] - X'[i-1], Y''[i] = Y'[i] - Y'[i-1]$$

Referring to Document 1, a route curvature κ[i] at each sample point is determined as represented by Equation 8.

$$\kappa[i] = \frac{X'[i] \cdot Y''[i] - X''[i] \cdot Y'[i]}{\{(X'[i])^2 + (Y'[i])^2\}^{\frac{3}{2}}} \quad \text{Equation 8}$$

A turning radius ρ[i] at this moment is determined by Equation 9.

$$\rho[i] = \frac{1}{\kappa[i]} \quad \text{[Equation 9]}$$

Thus, the vehicle control device can predict a curvature ahead of the vehicle when coordinates ahead of the vehicle are accumulated as, for example, map data.

Moreover, the vehicle control device can predict a route curvature ahead of the vehicle when a view ahead of the vehicle can be measured from, for example, images of a vehicle-mounted camera to extract a central part of a traveling route in a driving range of the vehicle, for example, a lane center as coordinate data.

In other words, on the basis of the relationship of FIG. 3, the vehicle control device can predict curve approach, a steady turn, and exit out of a curve ahead of a vehicle.

Information usable for obtaining an out-in-out line by the vehicle control device is speed information and curvature information on a vehicle. The vehicle control device needs to determine, from the information, an offset amount of a target position from a lane center line (in other words, a reference line in a traveling route) in the width direction of a traveling route.

The lane center line is a virtual line drawn at the center of a traveling route of a vehicle, that is, a lane or a driving area in the width direction.

Concepts for a curve are three phases: curve approach, turning at a curve, and exit out of a curve.

Among the phases, the phase of turning at a curve is a steady and circular turn.

It is assumed that an offset made from the lane center line to obtain an out-in-out line is necessary for a transient status.

Furthermore, in order to obtain an offset for an out-in-out line, an offset need to be examined for the two phases of curve approach and exit out of a curve.

Hence, regardless of examination of three offsets for an out-in-out line at a curve, a traveling vehicle moves outward or stays on the inner side depending upon the pattern of a subsequent curve according to a concept of an out-in line at an ordinary curve.

The direction of an offset on a cornering line called out-in-out will be described below.

Figure 5:
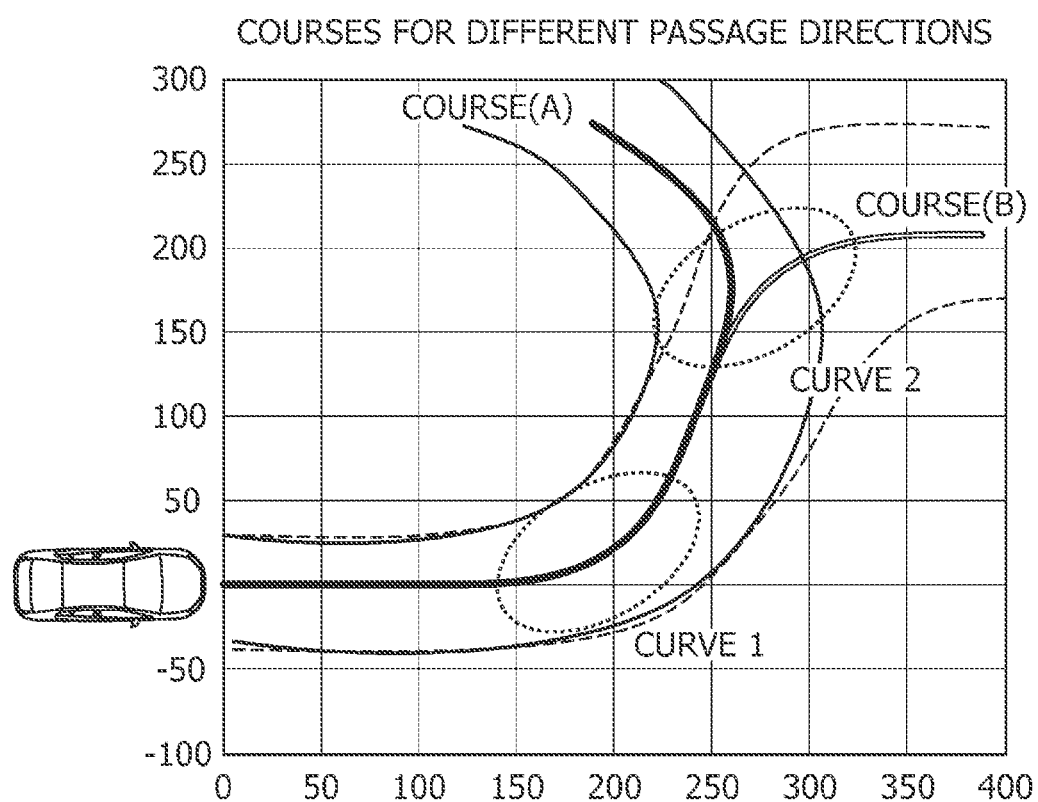
FIG. 5 is a diagram showing complex courses (A) and (B) including two curves.

FIG. 5 shows two courses (A) and (B) having different curves.

Course (A) and course (B) in FIG. 5 each indicate the center line of a traveling route, that is, a lane center line. A margin of a road width is provided on the left and right of the lane center line. An offset of a target trajectory is made in the range of the margin, that is, in a range that does not allow a vehicle to deviate from the road width.

In the course setting, a first half of course (A) and course (B) is a curve section (1) that turns to the left. At a subsequent curve section (2), course (A) further turns to the left while course (B) further turns to the right.

Figure 6A:
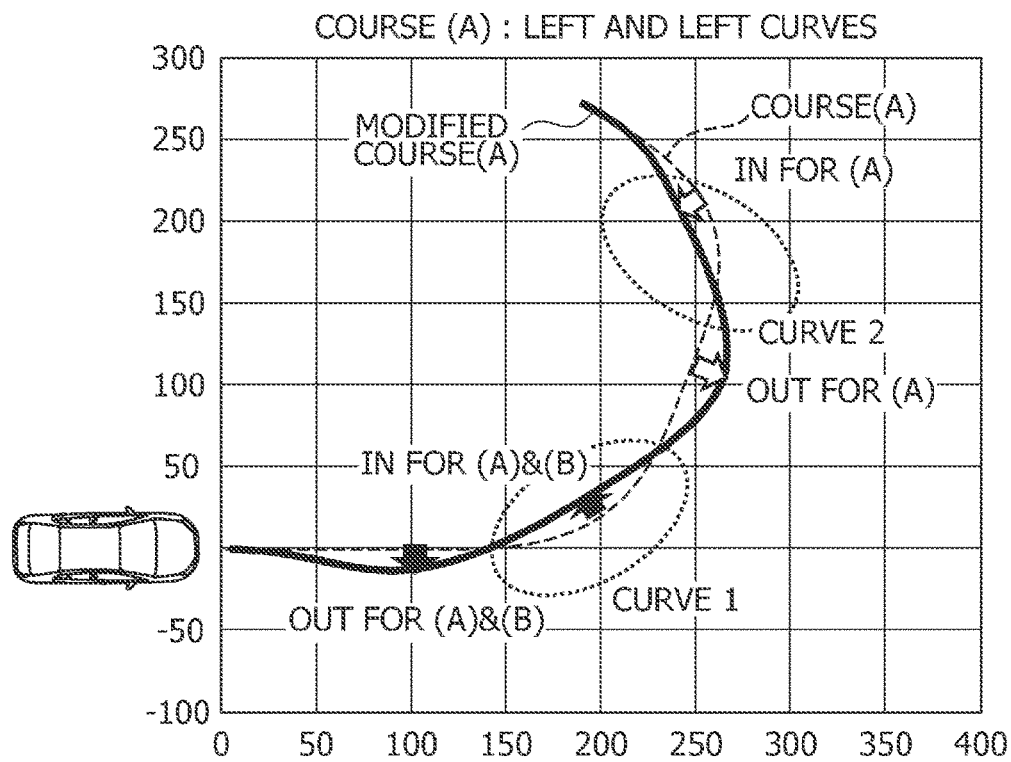
FIG. 6A is a diagram showing an out-in-out line for course (A) in FIG. 5.
Figure 6B:
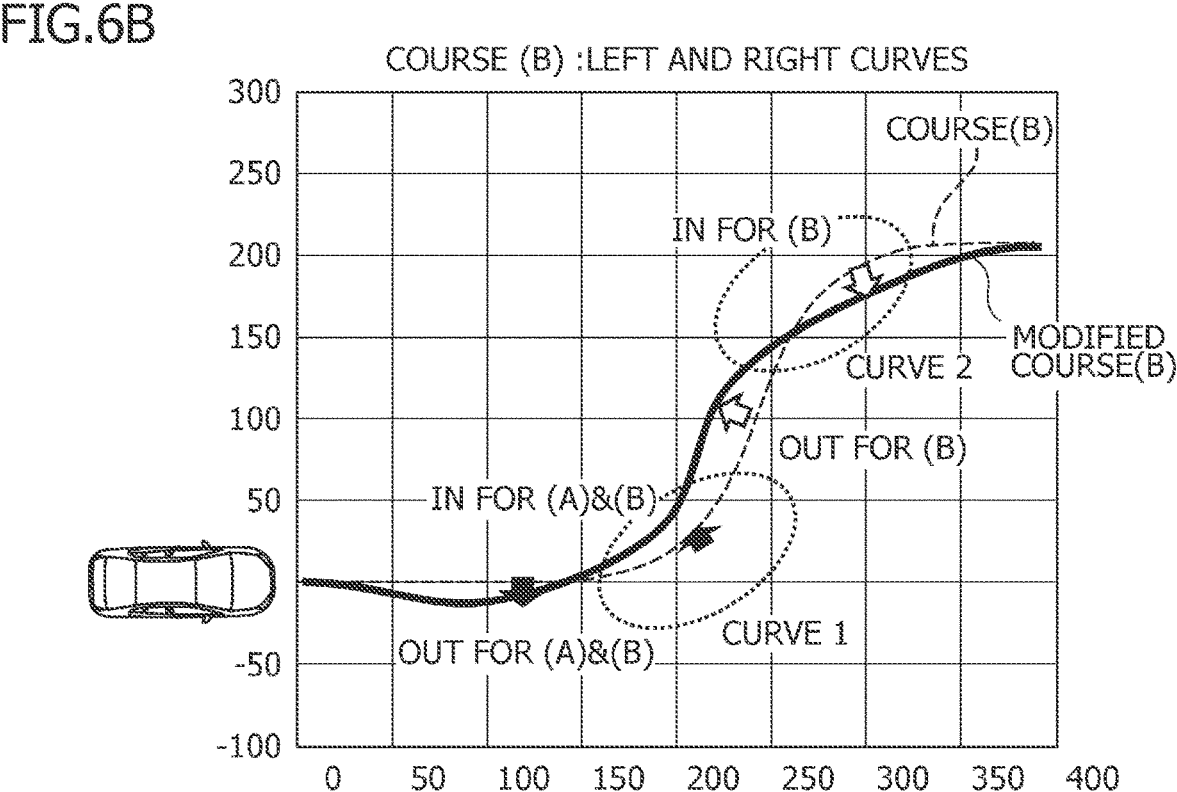
FIG. 6B is a diagram showing an out-in-out line for course (B) in FIG. 5.

FIG. 6A shows an out-in-out line for course (A) in FIG. 5. FIG. 6B shows an out-in-out line for course (B) in FIG. 5.

In FIGS. 6A and 6B, a dotted line indicates a lane center line and a solid line indicates an out-in-out line in steering by an expert driver.

In FIGS. 6A and 6B, arrows each indicate the direction of an offset from the lane center line.

In curve section (1), courses (A) and (B) are both left curves, and thus, the out-in-out line upstream of curve section (1) is positioned on the right side of the course, that is, the outer side, and then the out-in-out line in curve section (1) is positioned on the left side of the course, that is, on the inner side.

Subsequently, curve section (2) of course (A) is a left curve, and thus, the outer side for an offset at the approach into curve section (2) is rightward with respect to the lane center.

In curve section (2) of course (A), the vehicle travels along the line offset to the left side of the course, that is, inward with respect to the lane center.

In this case, the traveling line of course (A) forms an out-in-out line before and after curve section (1).

Curve section (2) of course (B) is a right curve, and thus, the outer side for an offset at the approach into curve section (2) is leftward with respect to the lane center.

In curve section (2) of course (B), the vehicle travels along the line offset to the right side of the course, that is, inward with respect to the lane center.

In this case, the traveling line of course (B) forms an out-in-in line before and after curve section (1).

As described above, it can be assumed that a cornering line called out-in-out is a combination of two offsets: an outward offset in curve approach and an inward offset in turning at a curve. An actual line may be an out-in-out line or an out-in-in line.

Furthermore, in an out-in-out line, an outward offset is made as a first offset before a curve and an inward offset is made as a subsequent offset before the end of the curve. The outward offset needs to be calculated before approach into the curve, and the inward offset needs to be calculated before exit out of the curve.

(2) Acceleration and Deceleration Control (G-Vectoring) in Relation to a Lateral Motion Acceleration and deceleration control in relation to a lateral motion is a method for improving the handling and stability of a vehicle by moving a load between the front wheels and the rear wheels through automatic acceleration and deceleration in relation to a lateral motion produced by a steering operation.

Equation 10 is a computational expression of a longitudinal acceleration command value $G_{xc}$ that is an acceleration and deceleration command value in acceleration and deceleration control in relation to a lateral motion. Longitudinal acceleration command value $G_{xc}$ is basically a value obtained by multiplying a lateral jerk $G_{y\_dot}$ by a gain $C_{xy}$ and adding a first-order lag to lateral jerk $G_{y\_dot}$.

In Equation 10, $G_y$ is a vehicle lateral acceleration, $G_{y\_dot}$ is a vehicle lateral jerk, that is, a first-order differential value of acceleration, $C_{xy}$ is a gain, T is a first-order lag time constant, s is a Laplace operator, and $G_{x\_DC}$ is an acceleration and deceleration command irrelevant to a lateral motion.

It is confirmed that acceleration and deceleration control in relation to a lateral motion can simulate a part of a linkage control strategy for lateral and longitudinal motions of an expert driver and improve the handling and stability of a vehicle.

$$G_{xc} = -\mathrm{sgn}(G_y \cdot \dot{G}_y)\frac{C_{xy}}{1+Ts}|G_y| + G_{x\_DC} \qquad \text{Equation 10}$$

Acceleration and deceleration command $G_{x\_DC}$ irrelevant to a lateral motion in Equation 10 is a deceleration component irrelevant to a lateral motion and an anticipated deceleration in the presence of a curve ahead of a vehicle or a term necessary for a section speed command.

Moreover, an sgn (signum) term in Equation 10 is a term provided to obtain the foregoing operation at a right curve and a left curve.

The longitudinal acceleration command value $G_{xc}$ can implement operations for decelerating at the start of steering inward, stopping deceleration because a lateral jerk is substantially 0 in a steady turn, and accelerating at the exit out of a curve at the start of steering backward.

If the vehicle control device controls a vehicle according to Equation 10, a composite acceleration G of a longitudinal acceleration and a lateral acceleration is expressed as a motion making a transition like a curve with the passage of time in a "g-g" diagram with a longitudinal acceleration of a vehicle on the horizontal axis and a lateral acceleration of a vehicle on the vertical axis. A control method using Equation 10 as a control law is called "G-Vectoring control."

(3) G-Vectoring Control and Preview G-Vectoring Control

Adaptive cruise control systems using the Global Positioning System (GPS) and map data have been proposed in recent years, and acceleration and deceleration control with the GPS has been practically used.

In response to the proposal, preview G-vectoring control is proposed as new longitudinal acceleration control that hardly causes discomfort. The preview G-vectoring control adds the GPS and map data to G-vectoring control only with vehicle motion information and is extended to an area irrelevant to a lateral motion, e.g., deceleration before approach into a curve.

Figure 7:
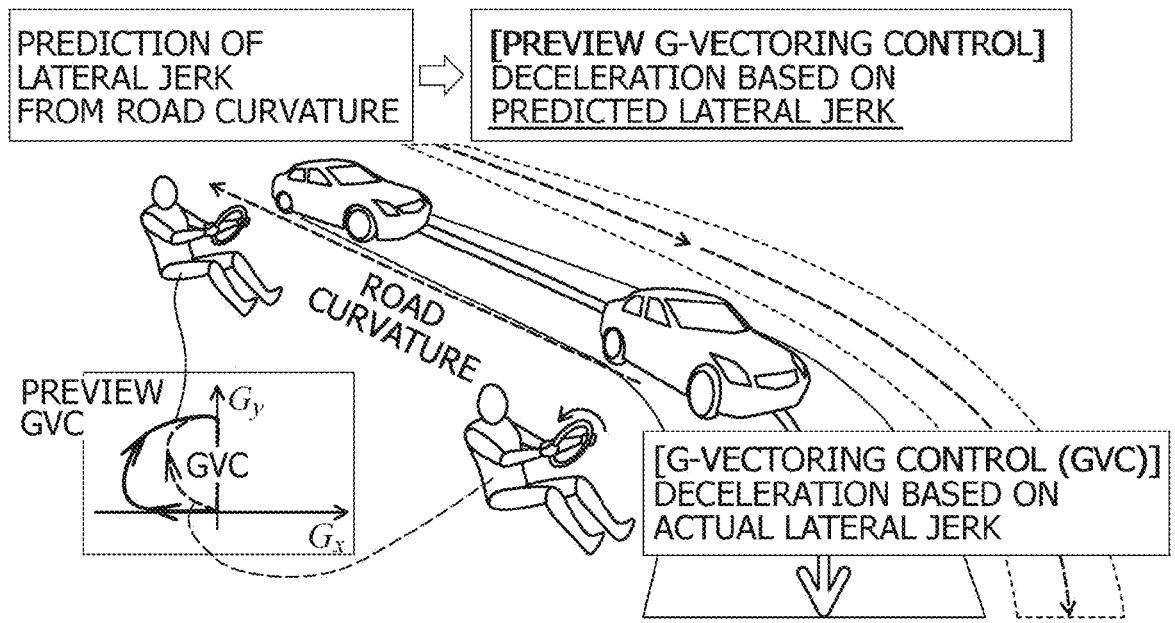
FIG. 7 is a diagram showing the concept of preview G-vectoring control.

FIG. 7 shows the concept of preview G-vectoring control.

In conventional G-Vectoring control, deceleration is controlled on the basis of a lateral jerk on a vehicle after approach into a curve, whereas in preview G-vectoring control, an estimated lateral jerk on the vehicle is determined beforehand from a road curvature ahead of the vehicle, so that deceleration is controlled before an approach into a curve.

Figure 8:
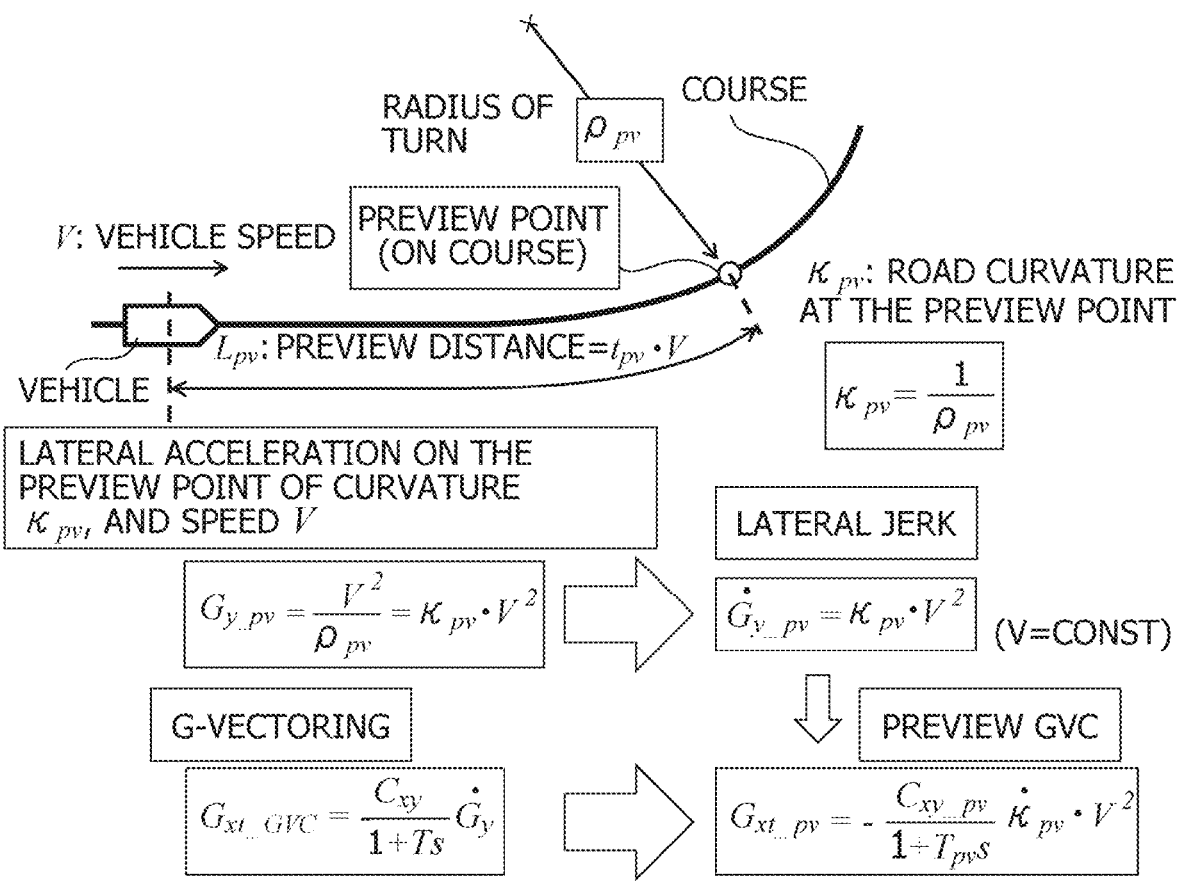
FIG. 8 is a conceptual diagram of the acceleration and deceleration model based on a change in road curvature over time.

FIG. 8 is a conceptual diagram of an acceleration and deceleration model based on a change in road curvature over time.

In the present model, a preview point with a moving speed $V_{pv}$ is set at a distance $L_{pv}$ [m] from a vehicle on a course ahead of the vehicle, and a longitudinal acceleration command value $G_{xt\_pv}$ is calculated on the basis of a change in road curvature $\kappa_{pv}$ over time at the preview point.

Equation 11 shows a basic equation of the acceleration and deceleration model.

$$G_{xt\_pv} = -\frac{C_{xy\_pv}}{1+T_{pv}s} \cdot \dot{k}_{pv} \cdot V^2 \qquad \text{Equation 11}$$

In Equation 11, V is a speed of a vehicle, $C_{xy\_pv}$ is a gain, $T_{pv}$ is a time constant, $\kappa_{pv}$ is a road curvature of the preview point, and "." above $\kappa_{pv}$ indicates a time deviate. Distance $L_{pv}$ from the vehicle to the preview point is provided as the product of vehicle speed V and preview time $t_{pv}$.

A longitudinal acceleration is generated on the basis of longitudinal acceleration command value $G_{xt\_pv}$ obtained by Equation 11, thereby enabling decelerating the vehicle before an approach into a curve.

By combining longitudinal acceleration command value $G_{xt\_pv}$ obtained by Equation 11 and a longitudinal acceleration command value $G_{xt\_GVC}$ obtained by conventional G-vectoring control, longitudinal acceleration control is achieved in relation to a lateral motion actually generated on a vehicle, so that deceleration control is continuously performed from a time before an approach to a curve to the time of a steady turn.

Figure 9A:
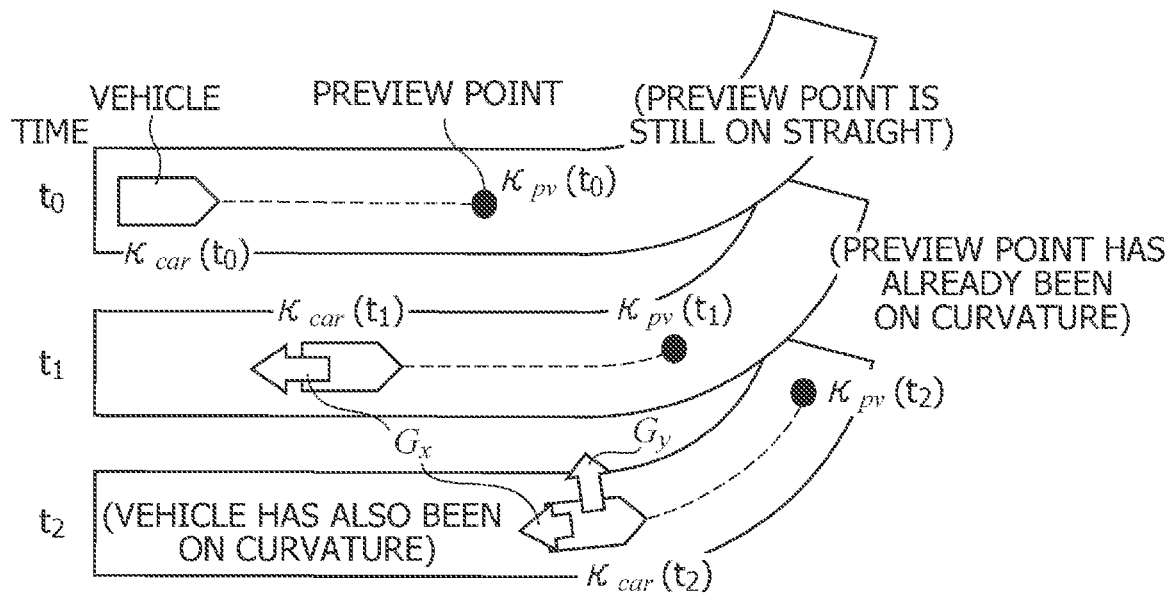
FIG. 9A is a diagram showing a deceleration before approach into a curve, and a change in a preview point over time.
Figure 9B:
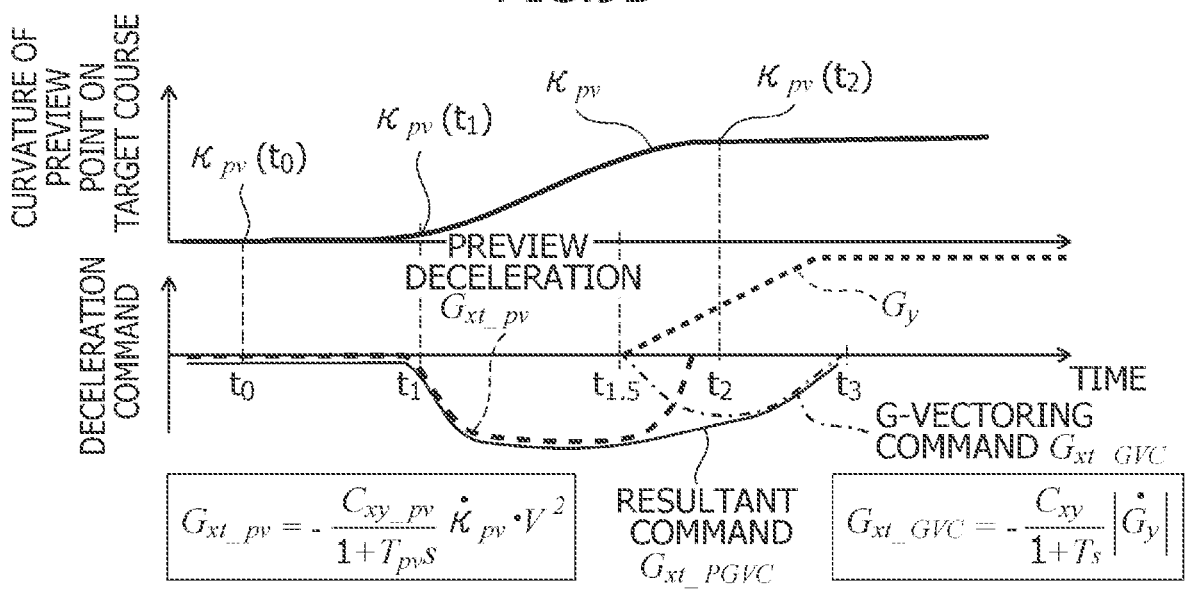
FIG. 9B is a diagram showing a deceleration before approach into the curve, and a correlation between a curvature and a deceleration command at the preview point.
Figure 9C:
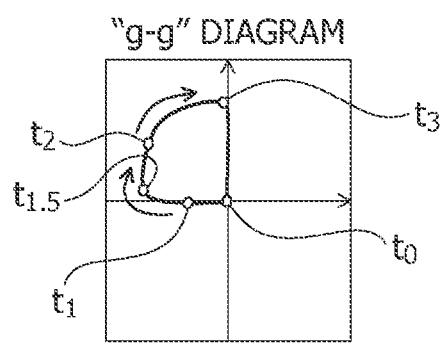
FIG. 9C is a diagram showing a deceleration before approach into the curve, and a correlation between a longitudinal acceleration and a lateral acceleration.

FIGS. 9A, 9B, and 9C show deceleration before an approach to a curve in deceleration control based on Equation 11. FIG. 9C is a "g-g" diagram with the horizontal axis indicating a longitudinal acceleration and the vertical axis indicating a lateral acceleration.

When the preview point reaches time t1 after an approach into a curve from time to before the approach into the curve, road curvature $\kappa_{pv}$ increases at the preview point.

Thus, a change in road curvature $\kappa_{pv}$ over time becomes positive and negative longitudinal acceleration command value $G_{xt\_pv}$ is calculated, so that the vehicle decelerates before the approach into the curve.

As described above, road curvature time-change $\kappa_{pv}$ ahead of the vehicle is used for calculating longitudinal acceleration command value $G_{xt\_pv}$. This can extend acceleration and deceleration control by G-vectoring control to an area before a lateral motion is actually generated on the vehicle, thereby enabling achieving deceleration before an approach into a curve.

Moreover, longitudinal acceleration command value $G_{xt\_pv}$ is provided in proportion to a change in road curvature over time. Thus, at the same curve, deceleration is increased by a road curvature rapidly changing at a high speed, whereas deceleration is reduced at a low speed.

At a higher speed, a lateral jerk generated on a vehicle increases, raising longitudinal acceleration command value $G_{xt\_GVC}$ by G-vectoring control. Thus, longitudinal acceleration command value $G_{xt\_GVC}$ and longitudinal acceleration command value $G_{xt\_pv}$ have the same tendency.

For this reason, longitudinal acceleration command value $G_{xt\_pv}$ and longitudinal acceleration command value $G_{xt\_GVC}$ are highly compatible.

By combining the command values, as shown in FIGS. 9A, 9B, and 9C, a longitudinal acceleration command value $G_{xt\_PGVC}$ by preview G-vectoring control can be generated.

In preview G-vectoring control, longitudinal acceleration control with longitudinal acceleration command value $G_{xt\_pv}$ is performed before a vehicle approaches a curve (for example, at time t0 and time t1 in FIGS. 9A, 9B, and 9C), and longitudinal acceleration control according to conventional G-vectoring control is performed after the vehicle approaches the curve (for example, at time t2 in FIGS. 9A, 9B, and 9C), enabling continuous deceleration control from a time before the approach into the curve to the time of a steady turn.

Consequently, an acceleration change is obtained in a "g-g" diagram having a feeling of comfortable driving, in other words, such that a composite acceleration is vectored (see FIG. 9C).

Figure 10A:
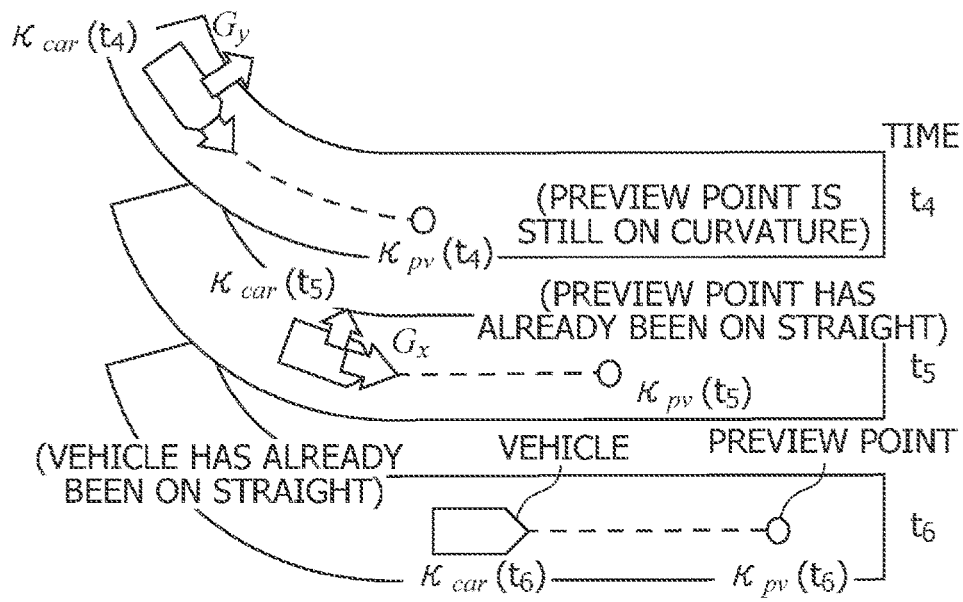
FIG. 10A is a diagram showing an acceleration before exit out of a curve, and a change in the preview point over time.
Figure 10B:
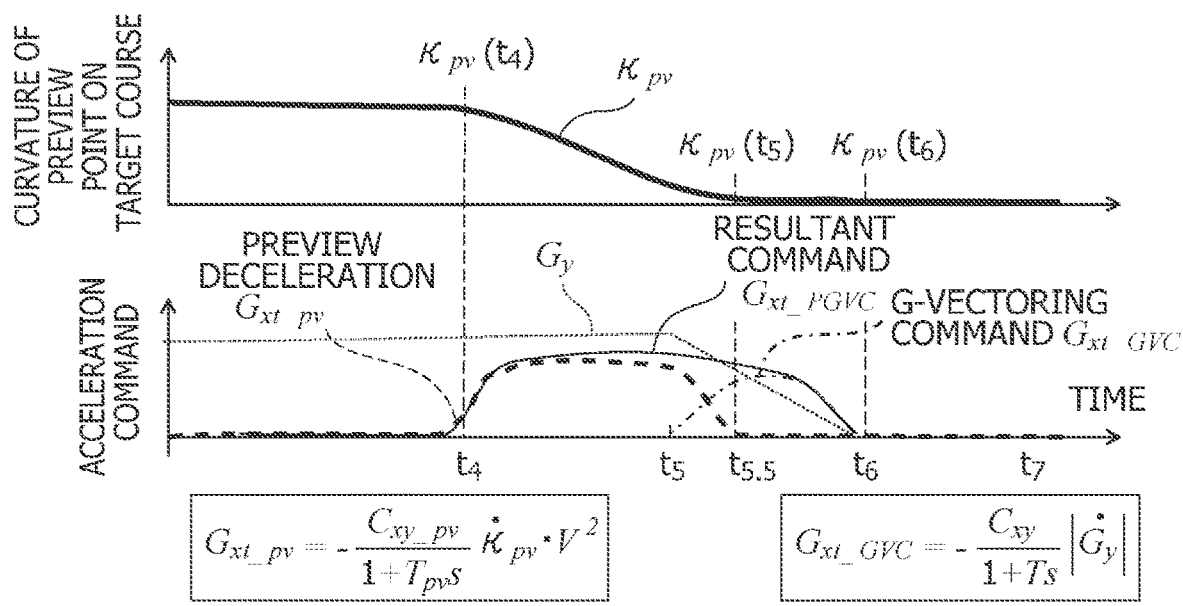
FIG. 10B is a diagram showing an acceleration before exit out of the curve, and a correlation between a curvature and an acceleration command at the preview point.
Figure 10C:
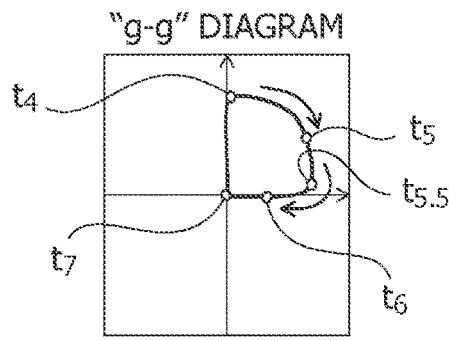
FIG. 10C is a diagram showing an acceleration before exit out of the curve, and a correlation between a longitudinal acceleration and a lateral acceleration.

FIGS. 10A, 10B, and 10C show a state of exit out of a curve.

FIG. 10C is a "g-g" diagram with the horizontal axis indicating a longitudinal acceleration and the vertical axis indicating a lateral acceleration.

As shown in FIGS. 10A and 10B, in a state at time t5 when a vehicle is still traveling at a curve, the preview point is located out of the curve, and thus, road curvature $\kappa_{pv}$ decreases at the preview point.

Thus, a change in road curvature $\kappa_{pv}$ over time becomes negative at time t5 and positive longitudinal acceleration command value $G_{xt\_pv}$ is calculated, so that the vehicle is controlled to accelerate from a midpoint of a turn to the exit out of the curve.

Also, at the exit out of the curve, longitudinal acceleration command value $G_{xt\_pv}$ and longitudinal acceleration command value $G_{xt\_GVC}$ are highly compatible. By combining the command values, longitudinal acceleration command value $G_{xt\_PGVC}$ by preview G-vectoring control can be generated as shown in FIG. 10B.

Thus, an acceleration change is obtained in a "g-g" diagram having a feeling of comfortable driving, in other words, such that a composite acceleration is vectored (see FIG. 10C).

Hereinafter, an offset amount calculation method (a vehicle control method, a target trajectory calculation method) for obtaining an out-in-out line with reference to the preview G-Vectoring control, that is, embodiments of a vehicle control device, a vehicle control method, a target trajectory calculation method, and a vehicle according to the present invention will be described in detail.

As has been discussed in the description of FIGS. 6A and 6B, in order to obtain an out-in-out line, an outward offset needs to be calculated before approach into a curve and an inward offset needs to be calculated before exit out of the curve.

Figure 11:
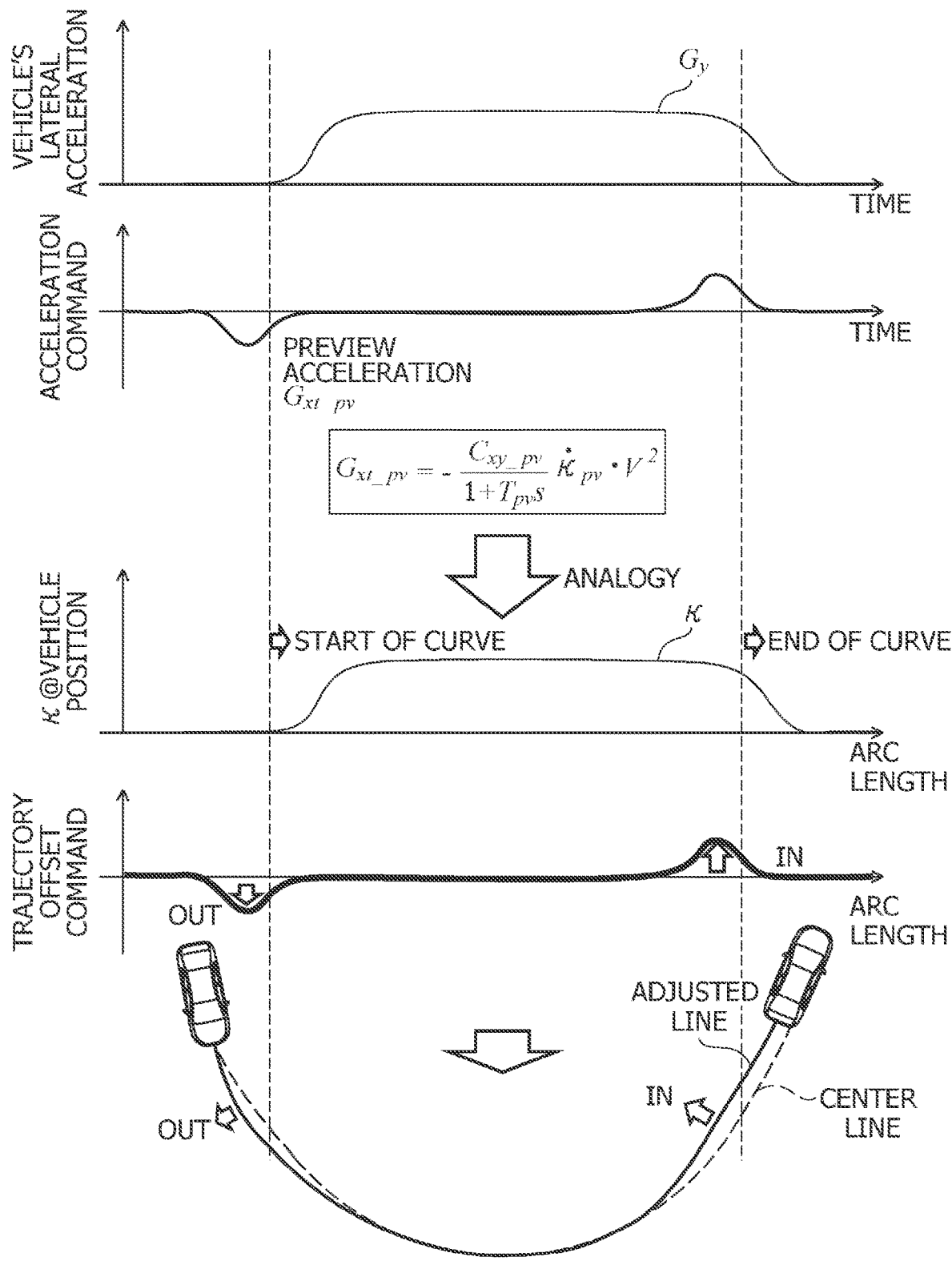
FIG. 11 is a diagram showing a correlation between an offset command value from a lane center line and an acceleration and deceleration command.

FIG. 11 shows a correlation among a vehicle lateral acceleration, an acceleration and deceleration command value, a curvature, and an offset command value in preview G-vectoring control.

FIG. 11 shows a concept in which a deceleration is generated before a lateral acceleration is generated and an acceleration is generated before a lateral acceleration decreases.

In graphs indicating changes in a vehicle lateral acceleration and an acceleration and deceleration command value, the horizontal axes each indicate a time.

A curvature is obtained as a curvature at a vehicle traveling point, and the horizontal axis of a graph indicating a change in curvature is provided as an arc length parameter.

An offset command value is a command of an offset amount from a lane center line, and the horizontal axis of a graph indicating a change in offset command value is provided as an arc length parameter.

In this case, at substantially a constant traveling speed, a lateral acceleration and a curvature have substantially the same profile as indicated by Equation 4.

Moreover, as indicated by the graph of a curvature, the start and the end of a curve can be expressed as an arc length parameter value.

An offset command value in FIG. 11 is an offset amount from the lane center line and is a value determined with reference to an acceleration and deceleration command value of preview G-vectoring.

In this case, when preview G-vectoring control generates a deceleration command, a signal having substantially the same profile as a deceleration command value serves as an outward offset command value, whereas when preview G-vectoring control generates an acceleration command, a signal having substantially the same profile as an acceleration command serves as an inward offset command value.

The bottom of FIG. 11 shows a correlation between a target trajectory based on an offset command value and a lane center line.

The target trajectory in FIG. 11 forms an out-in(-out) line that curves to the outside (outward) during approach into a curve and curves to the inside (inward) during exit out of the curve.

As a basic concept of a method for calculating an offset from a lane center line according to the present invention, when the absolute value of a curvature change increases, an outward offset amount (outside a turn) opposite to the sign of a curvature is calculated according to change information on the curvature at a point ahead of a point where an offset is to be calculated.

Specifically, when a curvature increases leftward at a point ahead of a point where an offset is to be calculated, an offset amount is determined rightward. When a curvature increases rightward at a point ahead of a point where an offset is to be calculated, an offset amount is determined leftward.

When the absolute value of a curvature change decreases, an offset amount to the inside (inside a turn) is calculated in the same direction as the sign of the curvature.

A specific calculation logic and a calculation example of an offset amount calculation method, which is analytically derived, will be disclosed below.

FIG. 12A shows a vehicle position [$x_{ve}$, $y_{ve}$] on a lane center line, a preview point [$x_{pv}$, $y_{pv}$] on the lane center line, and an offset from the vehicle position. FIG. 12B shows waypoint data on the lane center line.

In the present example, it is assumed that XY plane coordinates on the lane center line are expressed in advance as point series data by a series of N sample points [x(i), y(i)], i=1, . . . , N.

Thus, a vehicle position [$x_{ve}$, $y_{ve}$] on the lane center line and a preview point [$x_{pv}$, $y_{pv}$] on the lane center line are included in the sample points.

In this case, a series of curvatures κ(i) (i=1, . . . , N), which are the results of calculation using Equation 8, at respective points and a rate of change in curvature (dκ/ds) relative to arc length parameter s are also added to data on the points.

If the series of points of i=1 is the origin point of a coordinate system and a straight line connecting the series of points of i=2 is located on the x axis, the azimuth angle of the lane center line can be calculated at each moment by Equation 12 and the information can be added to the data on the points.

$$\theta(i) = \int_0^i \kappa(i)ds = \sum_0^i \kappa(i) \qquad \text{Equation 12}$$

The data of various types is stored for each sample point, as waypoint data on the lane center line (see FIG. 12B).

First Embodiment

In a first embodiment, an offset amount d(i) is calculated for each point (in other words, for each sample point) by using the waypoint data on a lane center line, a target position for obtaining an out-in-out line is corrected, and new point series data X(i), Y(i), that is, a target trajectory corrected from the lane center line is determined.

Hereinafter, the position of a vehicle is an expression for convenience in writing. In the presence of waypoint data on a lane center line, the following method can be calculated off-line.

In the case of off-line calculation, the calculation is performed at a fixed speed. Thus, a target trajectory corrected from the lane center needs to be calculated beforehand relative to a plurality of speed ranges.

The target trajectory, which has been corrected from the lane center line calculated beforehand, may be stored in advance as map data in the vehicle control device so that the vehicle control device may control the autonomous vehicle along the trajectory.

During autonomous driving, the vehicle control device can also control an actuator along a target trajectory while making a correction to a lane center line ahead of the vehicle to calculate the target trajectory.

Referring to FIGS. 12A and 12B, a specific calculation logic will be described below.

As described above, the deceleration command of preview G-vectoring control is set as an outward offset and the acceleration command is set as an inward offset, thereby enabling obtaining offsets before approach into a curve and before exit out of the curve (see FIG. 11).

As shown in FIG. 12A, when the preview point has a turning radius $\rho_{pv}$ at a distance $L_{pv}$ ahead of the position of the vehicle on the lane center line, the curvature $\kappa_{pv}$ at the preview point at the distance $L_{pv}$ is represented as $\kappa_{pv}=1/\rho_{pv}$.

Information on the curvature $\kappa_{pv}$ is described in the waypoint data (see FIG. 12B).

Referring to preview G-vectoring control, an offset amount $d_{ve}$ at each point on the lane center line is determined according to Equation 13 in which a first-order lag element or the like is omitted.

$$d_{ve} = -C_{O0}\kappa_{pv} = -C_{O0}\frac{d}{dt}\kappa_{pv} = -C_{O0}\frac{ds}{dt}\frac{d\kappa_{pv}}{ds} = -C_{O0}V_{pv}\frac{d\kappa_{pv}}{ds} \qquad \text{Equation 13}$$

In the basic concept of the present invention, an offset amount from the lane center line is determined according to a change in curvature over time at a preview point ahead of the position of the vehicle, in other words, a physical quantity for a change in curvature over time ahead of the vehicle on the traveling route of the vehicle.

In the case of a left curve in FIG. 12A, when a change in a curvature at the preview point is positive (increase to the left), the direction of an offset is determined as the negative direction of y axis of a vehicle fixed coordinates, in other words, a direction to the outside of the left curve.

When a change in a curvature at the preview point is negative at a left curve, that is, a curvature decreases to the left, which is not illustrated, the direction of an offset is determined as the positive direction of y axis of the vehicle fixed coordinates, in other words, a direction to the inside of the left curve.

Figure 13:
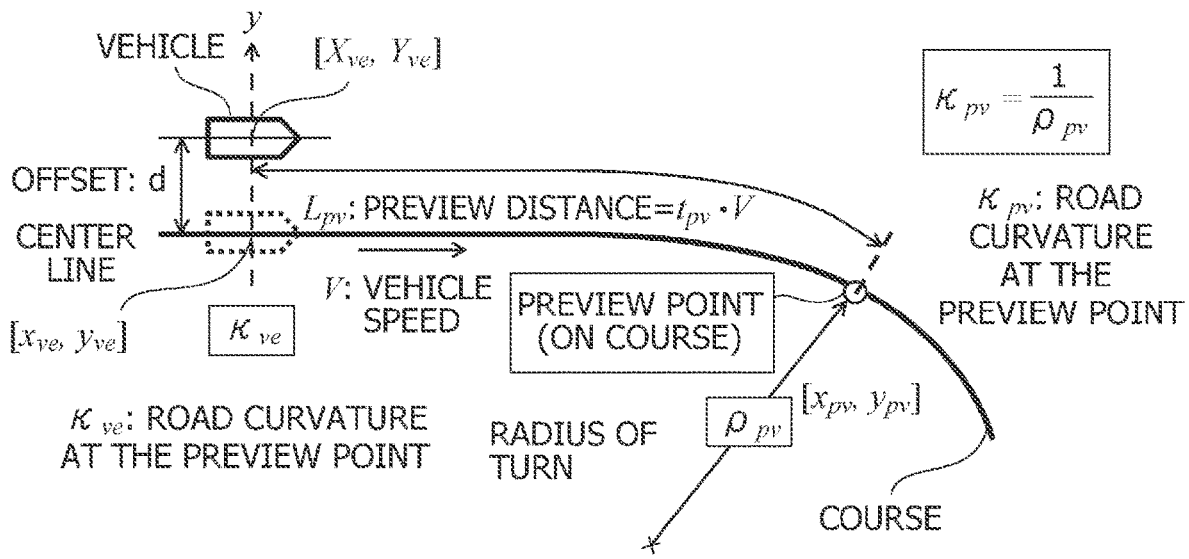
FIG. 13 is a diagram showing an offset from the position of the vehicle before approach into a right curve.

In the case of a right curve in FIG. 13, when a change in a curvature at the preview point is negative, that is, a curvature increases to the right, the direction of an offset is determined as the positive direction of the y axis of the vehicle fixed coordinates, in other words, a direction to the outside of the right curve.

When a change in a curvature at the preview point is positive at a right curve, that is, a curvature decreases to the right, which is not illustrated, the direction of an offset is determined as the negative direction of the y axis of the vehicle fixed coordinates, in other words, a direction to the inside of the right curve.

$C_{O0}$ in Equation 13 is a gain of an offset amount relative to a change in curvature over time. The gain $C_{O0}$ needs to be set in consideration of, for example, a target position not to be placed out of a road width by an offset even when a change in curvature over time is maximized.

The change in curvature over time is the product of a change in an arc length parameter over time (ds/dt) and a change in a curvature relative to a change in the arc length parameter (dκ/dt).

In this case, a change in the arc length parameter over time (ds/dt) is a moving speed of the preview point, so that offset amount $d_{ve}$ at the position of the vehicle is obtained on the rightmost side of Equation 13.

The offset amount $d_{ve}$ can be determined at each speed from a search result of the waypoint data in FIG. 12B.

Figure 14:
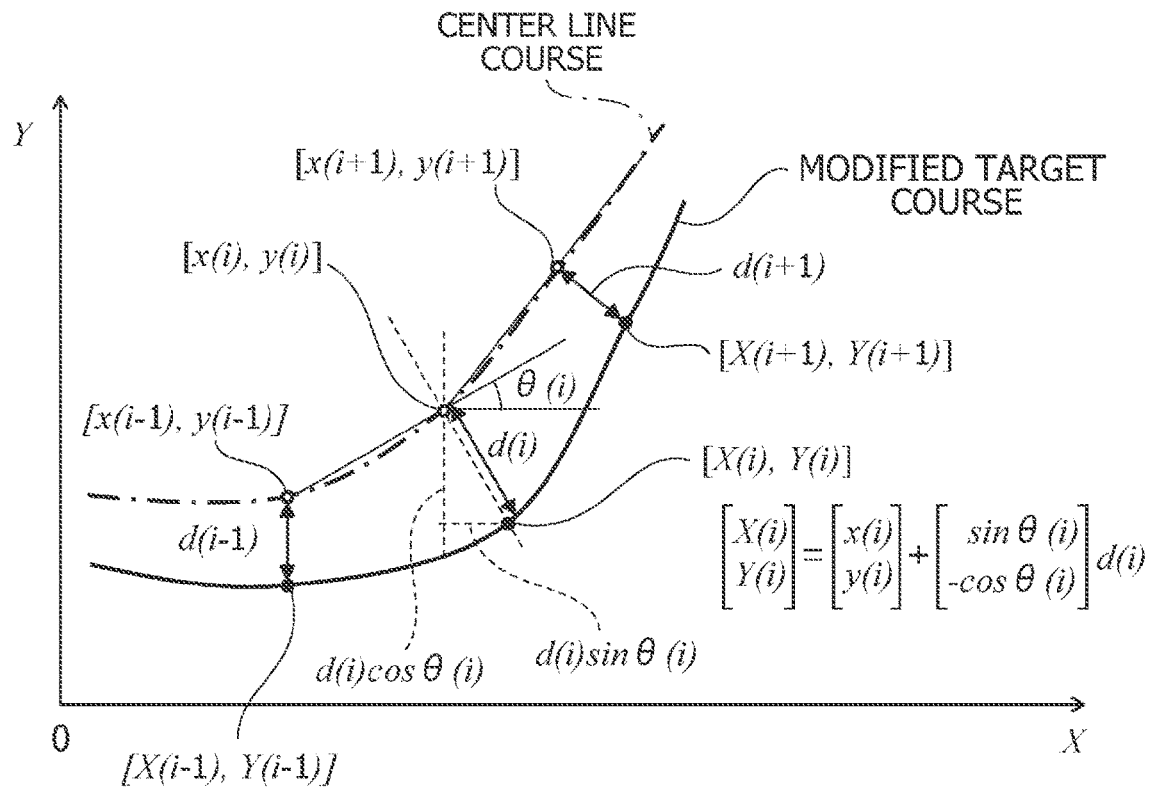
FIG. 14 is a diagram showing a method of generating a target trajectory after a correction based on an offset amount.

FIG. 14 shows a method of determining a target point (target position) $[X_{ve}, Y_{ve}]=[X(i), Y(i)]$ constituting a corrected target trajectory from the position of the vehicle $[x_{ve}, y_{ve}]=[x0(i), y0(i)]$ on the lane center line by using an offset amount (an offset amount of a coordinate value) calculated according to Equation 13.

As shown in FIG. 14, a transformation from the position of the vehicle [x0(i), y0(i)] to a corrected target point [X(i), Y(i)] is represented as Equation 14.

$$\begin{bmatrix} X(i) \\ Y(i) \end{bmatrix} = \begin{bmatrix} x(i) \\ y(i) \end{bmatrix} + \begin{bmatrix} \sin\theta(i) \\ -\cos\theta(i) \end{bmatrix} d(i), \qquad \text{Equation 14}$$

where θ(i) is an azimuth angle (angle relative to X axis) and d(i) is an offset amount in a fixed coordinate system O-XY of the lane center line.

Azimuth angle θ(i) is a physical quantity for the azimuth angle of a reference line on a traveling route with respect to a preset fixed coordinate system.

In the disclosed method, an offset amount is analytically calculated by using waypoint data on the lane center line, and a target point [X(i), Y(i)] constituting a target trajectory is calculated.

Specifically, in the target trajectory calculation method, a target position offset from the lane center line in the width direction of a traveling route is determined on the basis of a physical quantity for a change in curvature over time ahead of a vehicle and a physical quantity for the azimuth angle of the lane center line (reference line).

In the foregoing description, as shown in FIG. 14, a corrected target trajectory is determined as a displacement offset with respect to a coordinate point. A corrected target trajectory can be determined as an offset amount of a curvature as follows:

A curvature offset $\kappa d_{ve}$ is determined according to Equation 15.

$$\kappa_{dve} = \qquad\qquad\qquad\qquad\qquad\qquad \text{Equation 15}$$
$$-C_{Ok}\dot{\kappa}_{pv} = -C_{Ok}\frac{d}{dt}\kappa_{pv} = -C_{Ok}\frac{ds}{dt}\frac{d\kappa_{pv}}{ds} = -C_{Ok}V_{pv}\frac{d\kappa_{pv}}{ds}$$

Figure 15:
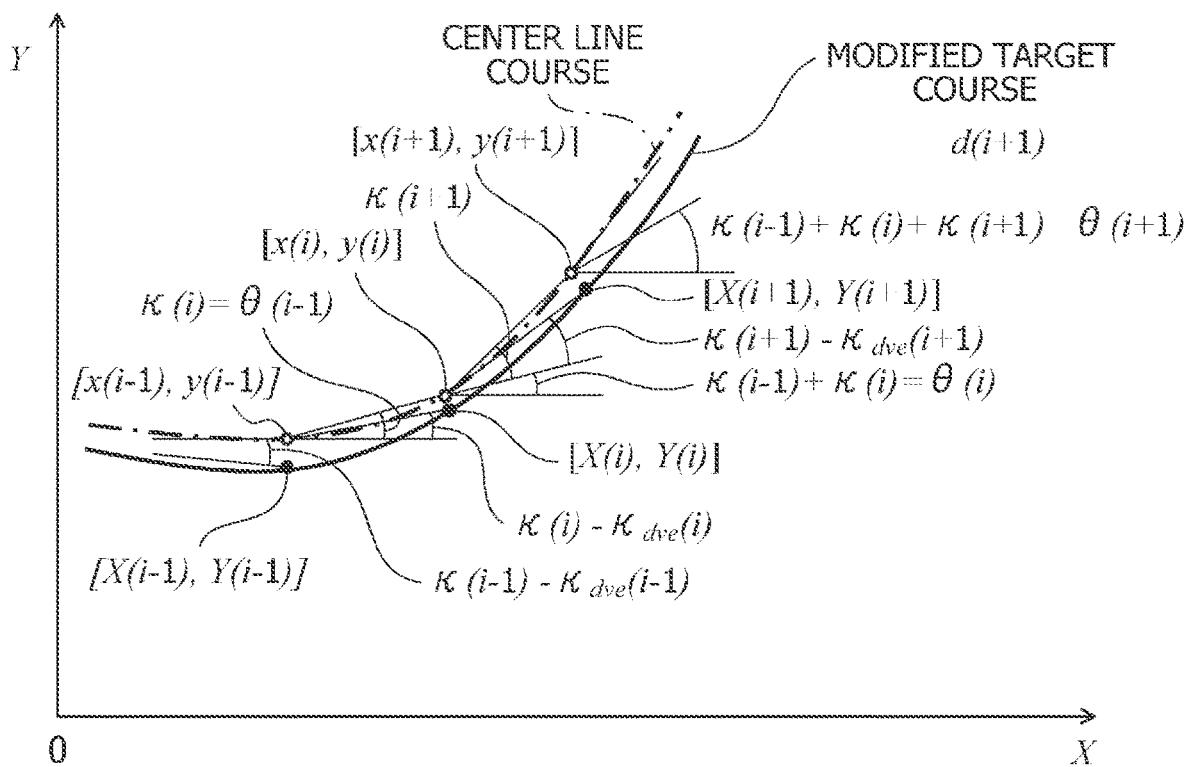
FIG. 15 is a diagram showing a calculation method when an offset amount is used as an offset amount of a curvature.

FIG. 15 shows a specific calculation method of a corrected target trajectory in a method of determining a target trajectory by using curvature offset $\kappa d_{ve}$.

If waypoint data on the lane center line is recorded for each unit arc length, Equation 16 is determined as follows.

$$\sqrt{(x(i)-x(i-1))^2 + (y(i)-y(i-1))^2} = 1 \qquad \text{Equation 16}$$

Considering reorientation by θ at a unit arc length (κ=dθ/ds), which is an original definition of curvature κ, azimuth angle θ formed by the tangent line of the lane center line and X axis is determined at each point i according to Equation 17.

$$\theta(i) = \sum_{j=1}^{i} \kappa(j) \qquad \text{Equation 17}$$

Thus, as shown in FIG. 15, a transformation from the position of the vehicle [x0(i), y0(i)] to a corrected target point [X(i), Y(i)] is represented as Equation 18.

$$\begin{bmatrix} X(i) \\ Y(i) \end{bmatrix} = \begin{bmatrix} x(i-1) \\ y(i-1) \end{bmatrix} + \qquad\qquad \text{Equation 18}$$
$$\sqrt{\frac{(x(i)-x(i-1))^2 +}{(y(i)-y(i-1))^2}} \begin{bmatrix} \cos(\theta(i)-\kappa_{dve}(i)) \\ \sin(\theta(i)-\kappa_{dve}(i)) \end{bmatrix} =$$
$$\begin{bmatrix} x(i-1) \\ y(i-1) \end{bmatrix} + \begin{bmatrix} \cos(\theta(i)-\kappa_{dve}(i)) \\ \sin(\theta(i)-\kappa_{dve}(i)) \end{bmatrix},$$

where θ(i) is an azimuth angle (angle relative to X axis) and $\kappa d_{ve}(i)$ is an offset amount in the fixed coordinate system O-XY of the lane center line.

As described above, the transformation of Equation 14 and the transformation of Equation 18 basically include the same information. However, Equation 14 determines an offset amount as a coordinate difference while Equation 18 determines an offset amount as a curvature difference.

In either case, a target trajectory of an out-in(-out) line may be calculated analytically by calculating an offset amount on the basis of information on a change in a curvature of the lane center line ahead of a vehicle, and by adding or subtracting the offset amount from the lane center line.

A target trajectory calculation method, a control device using the calculation method, a control method, and a vehicle according to the present invention include means for calculating an offset amount of a coordinate value or a curvature for each item of trajectory coordinate data on the basis of basic trajectory coordinate data on at least a part or all of a two-dimensional coordinate value, a trajectory curvature, and a trajectory azimuth angle at coordinates arranged in ascending order of arc length from a certain position serving as an origin point, in which an offset amount is added to each item of the trajectory coordinate data, new target trajectory coordinate data is constructed, and the trajectory of the vehicle is controlled on the basis of the target trajectory coordinate data.

Figure 16:
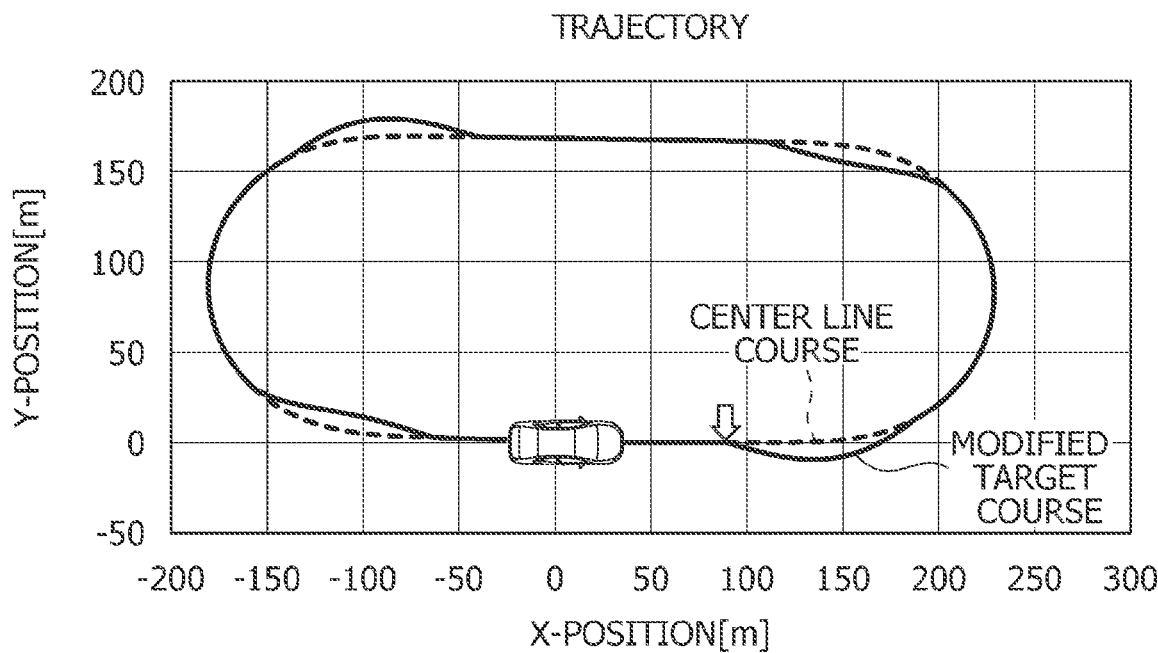
FIG. 16 is a diagram showing an example in which a target trajectory is generated by calculating an offset amount in a circuit track course.

FIG. 16 shows an example in which a target trajectory is generated by calculating an offset amount on the basis of waypoint data on a lane center line in a circuit track course according to the present invention.

In FIG. 16, the target trajectory looks discontinuous because an offset gain is set at a large value to increase the visibility of the corrected target trajectory.

A course indicated by a dotted line in FIG. 16 starts from the origin point of XY coordinates and travels along an arc with a radius of 80 m with a diminishing sine half wavelength tangent curve serving as a transition curve from the point of [X, Y]=[0, 100].

An offset amount is calculated from a point indicated by an arrow in FIG. 16, and a target trajectory is drawn outward. Thereafter, the offset amount becomes zero, so that a target trajectory returning to the lane center line is generated.

A first preview point indicated by the arrow in FIG. 16 is located on a linear route upstream of a transition curve and has no change in curvature over time.

However, at a second preview point located ahead of the first preview point on the course, the absolute value of a change in curvature over time increases to indicate a curve entrance. Thus, a target position is set that is offset outside the lane center line from a time when a change in curvature over time is zero. In other words, an offset amount is determined to the right or the left with respect to the first preview point.

At the end of the curve, a route curving inward early is also replicated.

Thereafter, the target trajectory returns onto the lane center line. The target trajectory is generated to shift outward in preparation for approach into a subsequent curve, return to the lane center line during traveling at the curve, and then curve inward early.

Specifically, when the absolute value of a change in curvature over time decreases at a preceding point before the vehicle exits out of a curve, a target position offset inside the lane center line, that is, inside a turn is set.

FIG. 16 shows the target trajectory with an offset serving as a coordinate difference. The same result is obtained when an offset serves as a curvature difference.

Second Embodiment

The foregoing method is the basic principle of the present invention. A further improved method will be described below as a second embodiment of the present invention.

Preview G-vectoring control uses a combination of a deceleration command (corresponding to the offset amount) created on the basis of a rate of change in forward curvature and a deceleration command proportionate to a lateral jerk generated when a vehicle travels on a transition curve.

In other words, in preview G-vectoring control, an element derived from information ahead of a vehicle and an element based on current information are combined to be used for control.

In the method of calculating an offset amount in Equation 13 and Equation 15, information at a vehicle position cannot be taken into consideration, and thus, the calculation method is changed as follows:

A moving speed at a preview point is set at V substantially equal to a vehicle speed, and $d\kappa_{pv}/ds$ obtained by differentiating the curvature of the preview point by an arc length parameter s is changed to a value obtained by dividing a difference between a curvature $\kappa_{pv}$ at the preview point and a curvature $\kappa_{ve}$ at a vehicle position by a distance $L_{pv}$.

Furthermore, an offset gain is redefined as $C_{Oo}/L_{pv}=C_o$, and the calculation method of an offset amount $d_{ve}$ is modified as represented by Equation 19.

$$d_{ve} = -C_{Oo}V\frac{\kappa_{pv} - \kappa_{ve}}{L_{pv}} = -C_O V(\kappa_{pv} - \kappa_{ve}) \qquad \text{Equation 19}$$

The modification in Equation 19 can simplify a calculation and explicitly add forward curvature information and current curvature information into the expression of offset amount $d_{ve}$.

Furthermore, according to Equation 19, as speed V increases, offset amount $d_{ve}$ changes to a larger amount.

Moreover, Equation 19 proves that an offset amount of first basic trajectory coordinate data with a small arc length from the origin point is calculated by using information of second basic trajectory coordinate data having a larger arc length than at least a first trajectory coordinate.

In other words, according to Equation 19, a physical quantity for a change in curvature over time can be determined from a difference between a first curvature at a first preview point ahead of a vehicle on a traveling route including the position of the vehicle and a second curvature at a second preview point located ahead of the first preview point ahead of the vehicle on the traveling route, and an offset amount at the first preview point can be determined on the basis of the change in curvature over time.

In other words, in the target trajectory calculation method of the present invention, an offset amount is determined on the basis of a physical quantity for a change in curvature over time on a traveling route ahead of a position where an offset amount is to be determined ahead of a vehicle on the traveling route.

According to the target trajectory calculation method according to the present invention, when a change in trajectory curvature relative to data before and after the second basic trajectory coordinate data increases leftward, a coordinate value offset in the normal direction of the first trajectory coordinate is made rightward or a curvature offset of the first trajectory coordinate is made rightward, whereas when a change in trajectory curvature increases rightward, a coordinate value offset in the normal direction of the first trajectory coordinate is made leftward or a curvature offset of the first trajectory coordinate is made leftward.

Specifically, according to the target trajectory calculation method of the present invention, a difference $\Delta\kappa(\Delta\kappa=\kappa_{pv}-$ $\kappa_{ve}$) is determined, where $\kappa_{pv}$ denotes a signed trajectory curvature, by which a left turn of the second basic trajectory coordinate data is positive, and $\kappa_{ve}$ denotes a signed trajectory curvature, by which a left turn of the first basic trajectory coordinate data is positive.

When difference $\Delta\kappa$ is positive, a coordinate value offset in the normal direction of the first trajectory coordinate is made rightward in proportion to a value obtained by multiplying difference $\Delta\kappa$ by a positive gain $C_0$, or a curvature offset of the first trajectory coordinate is made in the negative direction.

When difference $\Delta\kappa$ is negative, a coordinate value offset in the normal direction of the first trajectory coordinate is made leftward in proportion to a value obtained by multiplying difference $\Delta\kappa$ by positive gain $C_0$, or a curvature offset of the first trajectory coordinate is made in the positive direction.

The result of generation of a target trajectory according to Equation 19 will be described below. Actual corrected coordinates, in other words, a corrected target point is calculated according to Equation 14.

Figure 17:
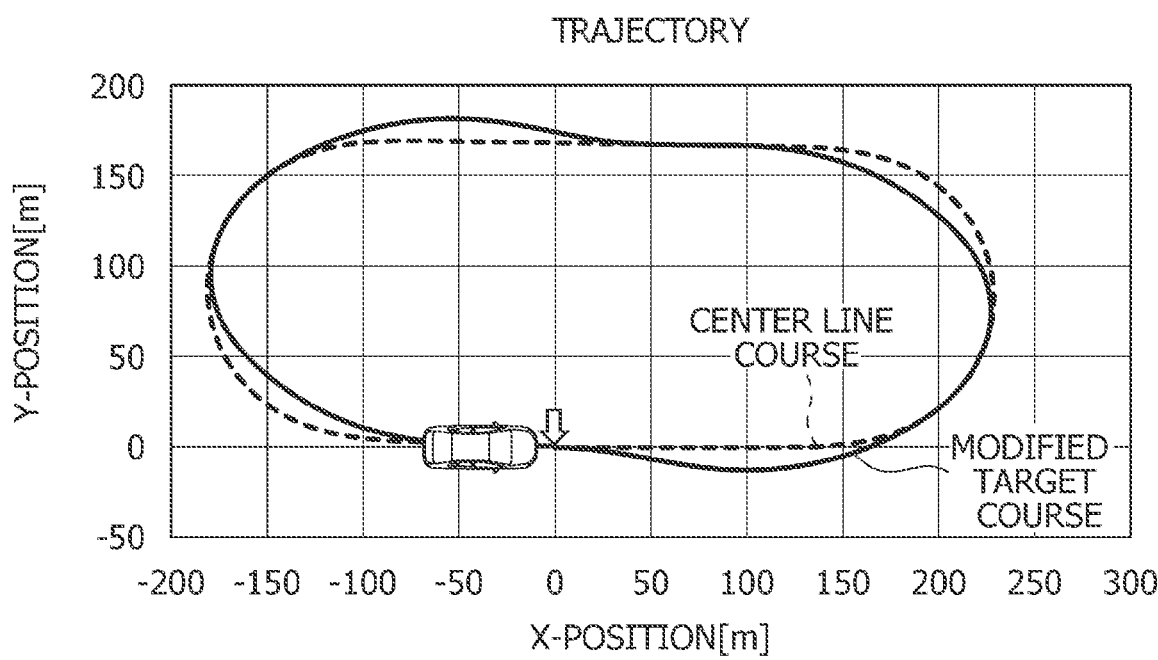
FIG. 17 is a diagram showing an example in which a target trajectory is generated by calculating an offset amount in the circuit track course using Equation 14.

FIG. 17 shows an example in which a target trajectory is generated as in FIG. 16 by calculating an offset amount according to Equation 14 by using waypoint data on a lane center line in a circuit track course.

In FIG. 17, an offset gain is set at a large value to increase the visibility of the corrected target trajectory.

Moreover, distance $L_{pv}$ is set at 100 [m] and an offset amount is calculated by using curvature information on a lane center line at a distance of 100 m ahead of a vehicle and curvature information on a current lane center line.

As in FIG. 16, a course in FIG. 17 (a dotted line in FIG. 17) starts from the origin point of XY coordinates and travels along an arc with a radius of 80 m with a diminishing sine half wavelength tangent curve serving as a transition curve from the point of [X, Y]=[0, 100].

An offset amount is calculated from a point (at a distance of 100 m upstream of the start of a transition curve) indicated by an arrow in FIG. 17, and a target trajectory is drawn outward. Thereafter, the offset amount becomes zero, so that a target trajectory returning to the lane center line is generated.

Specifically, according to the target trajectory calculation method of the present invention, a correction is started from a time when a signed trajectory curvature is zero, by which a left turn of the first basic trajectory coordinate data is positive.

At the end of the curve, a route curving inward early is also replicated.

Thereafter, the target trajectory returns onto the lane center line. The target trajectory is generated to shift outward in preparation for a subsequent curve, return to the lane center line during traveling at the curve, and then curve inward.

The target trajectory of FIG. 17 is smoother than the target trajectory of FIG. 16 and can replicate a state in which an outward offset is made beforehand upstream of the curve as in driving by an expert driver.

FIG. 17 shows the target trajectory with an offset serving as a coordinate difference. The same result is obtained when an offset serves as a curvature difference.

FIG. 17 shows that an out-in(-out) target trajectory is obtained for lane center line data, which continuously curves in the same direction, according to the present invention.

Subsequently, the calculation results of target trajectories for courses (A) and (B) in FIG. 5 using Equation 19 will be described.

Figure 18A:
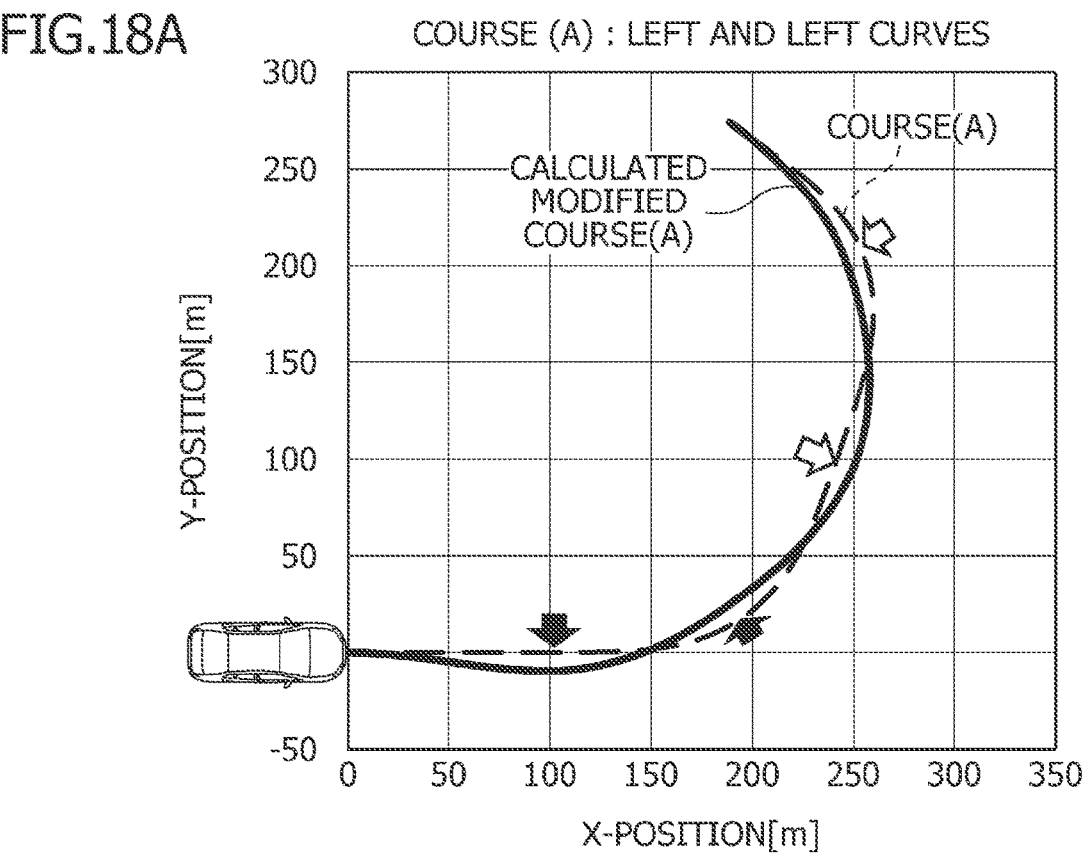
FIG. 18A is a diagram indicating the calculation result of a target trajectory for course (A) in FIG. 6A by applying the calculation method of a second embodiment.
Figure 18B:
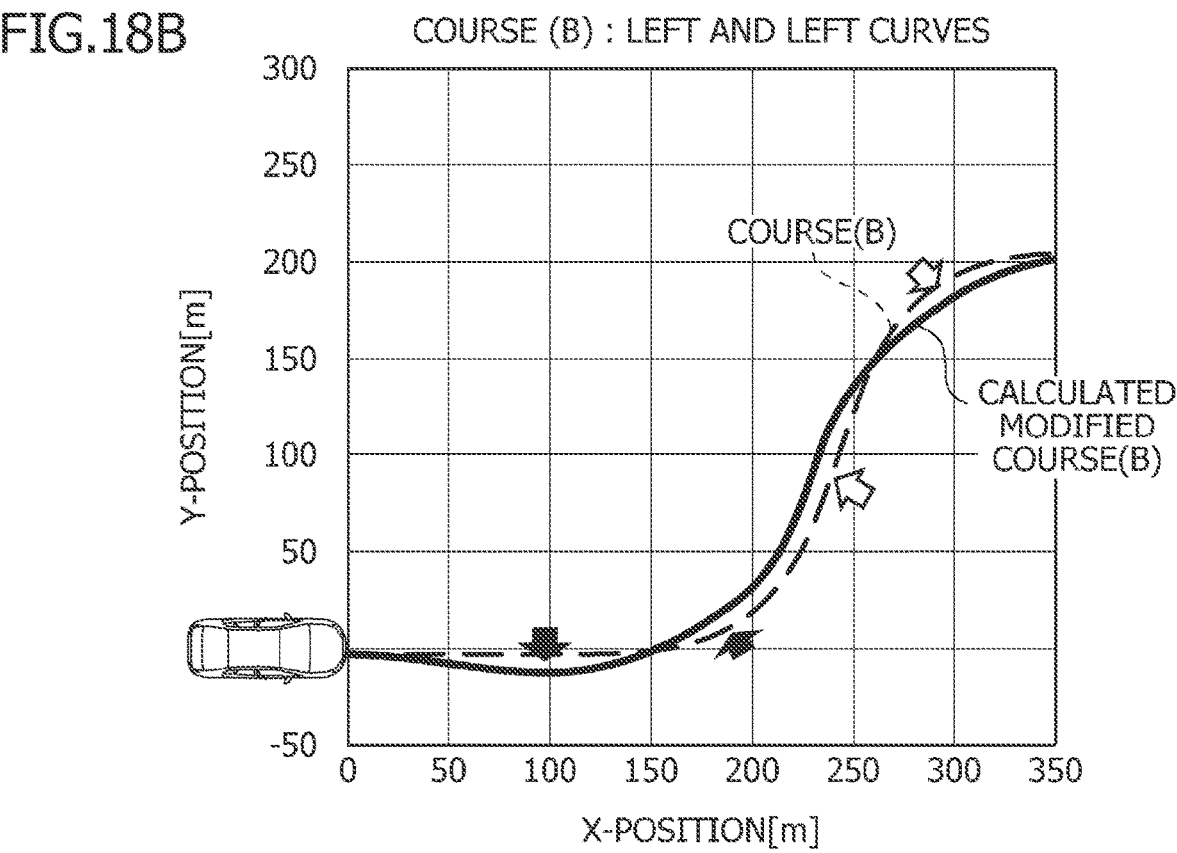
FIG. 18B is a diagram indicating the calculation result of a target trajectory for course (B) in FIG. 6B by applying the calculation method of the second embodiment.

FIGS. 18A and 18B show the calculation results of target trajectories for courses (A) and (B) in FIG. 5 using Equation 19. FIG. 18A shows a target trajectory on course (A) and FIG. 18B shows a target trajectory on course (B).

As illustrated in FIG. 5, course (A) passes through a first left curve and then enters another left curve (a dotted line in FIG. 18A).

A solid line in FIG. 18A indicates the calculation result of a target trajectory for course (A) using Equation 19.

It is understood that a target trajectory approaching the first curve and the second curve from the right side (in other words, from the outside) can be calculated.

The target trajectory qualitatively agrees with an out-in-out(in) line by an expert driver.

Course (B) passes through a first left curve and then enters a right curve (a dotted line in FIG. 18B).

A solid line in FIG. 18B indicates the calculation result of a target trajectory for course (B) using Equation 19. Operations such as switching parameters or signs are not performed.

It is understood that a target trajectory approaching the first curve from the right side (from the outside) and approaching the second curve from the left side (from the outside) can be calculated.

The target trajectory qualitatively agrees with an out-in-out(in) line by an expert driver.

As described above, it was able to be confirmed that according to a calculation method of the present invention, in which an offset amount is continuously calculated by using curvature change information on the lane center line ahead of a vehicle, an out-in-out(in) line by an expert driver can be quantitatively replicated from data on the lane center line according to the shapes and continuity of left and right curves.

Moreover, it became evident that an out-in-out line by an expert driver is actually an out-in line at a curve and whether the line is to be out-in-out or out-in-in is determined according to curvature information on a subsequent lane center line.

Figure 19:
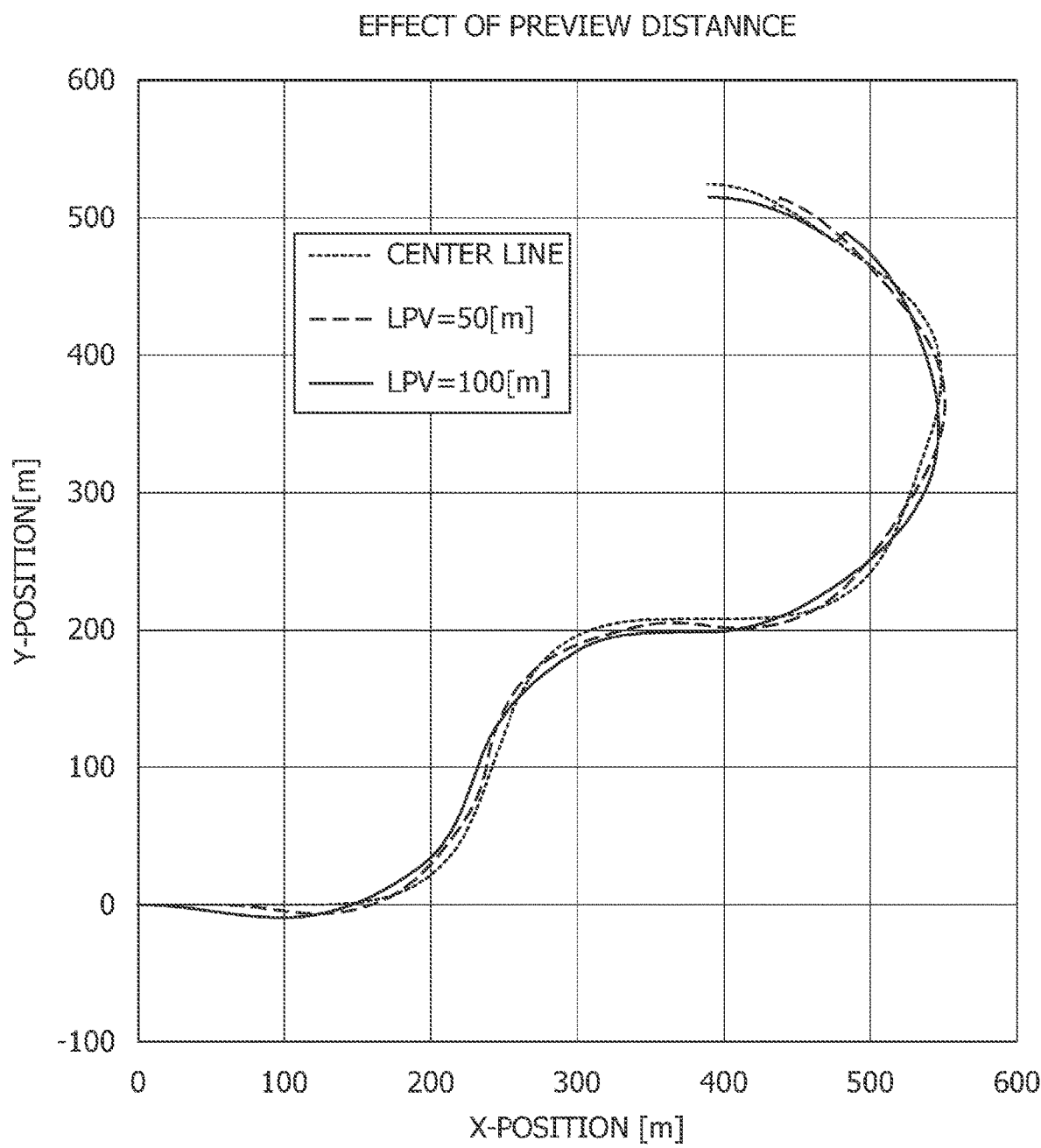
FIG. 19 is a diagram indicating the calculation result of a target trajectory when a distance to a preview point is changed on a complicated course.
Figure 20:
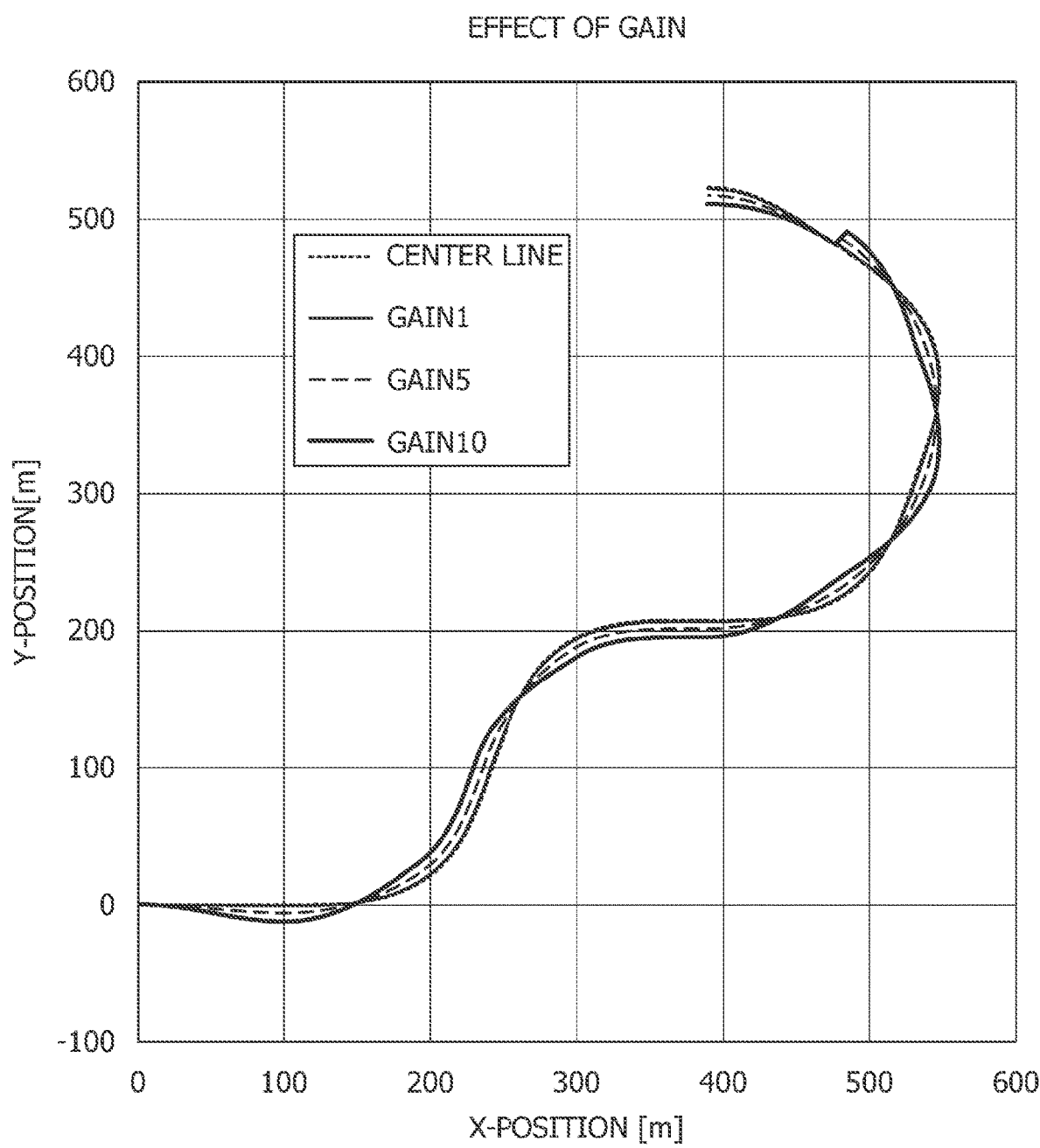
FIG. 20 is a diagram indicating the calculation result of a target trajectory when an offset gain is changed on a complicated course.

FIGS. 19 and 20 show how a complicated course is handled in the target trajectory calculation method according to the present invention.

From FIGS. 19 and 20, it can be confirmed that a trajectory by an expert driver, for example, an out-in-out line and a shortcut during successive curves can be replicated.

FIG. 19 shows a comparison between 50 m and 100 m as distance $L_{pv}$ from the position of a vehicle to the preview point.

As shown in FIG. 19, an extension of distance $L_{pv}$ causes an outward or inward offset upstream.

Thus, optimum distance $L_{pv}$ needs to be set according to conditions such as a course shape and a vehicle speed. It is evident that the target trajectory calculation method according to the present invention can replicate a trajectory like that of an expert driver by tuning distance $L_{pv}$.

FIG. 20 shows that distance $L_{pv}$ is 100 m, the nominal value of a product $C_o \cdot V$ (simply denoted as Gain in FIG. 20) of gain $C_o$ and vehicle speed V is 1, and the gain is multiplied by 5 and 10.

Also, for gain $C_o$, an optimum value needs to be set according to conditions such as a course shape and a vehicle speed. It is evident that the target trajectory calculation method according to the present invention can replicate a trajectory like that of an expert driver by tuning gain $C_o$.

In FIG. 20, discontinuity occurs around (X, Y)=(500, 500) in the absence of data at a distance of at least 100 m ahead of a vehicle.

For further tuning in the target trajectory calculation method according to the present invention, various settings can be made. For example, a variable gain at approach into a curve and exit out of a curve (in other words, an outer gain and an inner gain are different) is squared or raised to the third power of a traveling speed V in order to more clearly reflect speed dependence.

As tuning of the target trajectory calculation method according to the present invention, parameters such as distance $L_{pv}$ and gain $C_o$ can be also changed at the discretion of the driver or a passenger, or both.

Figure 21:
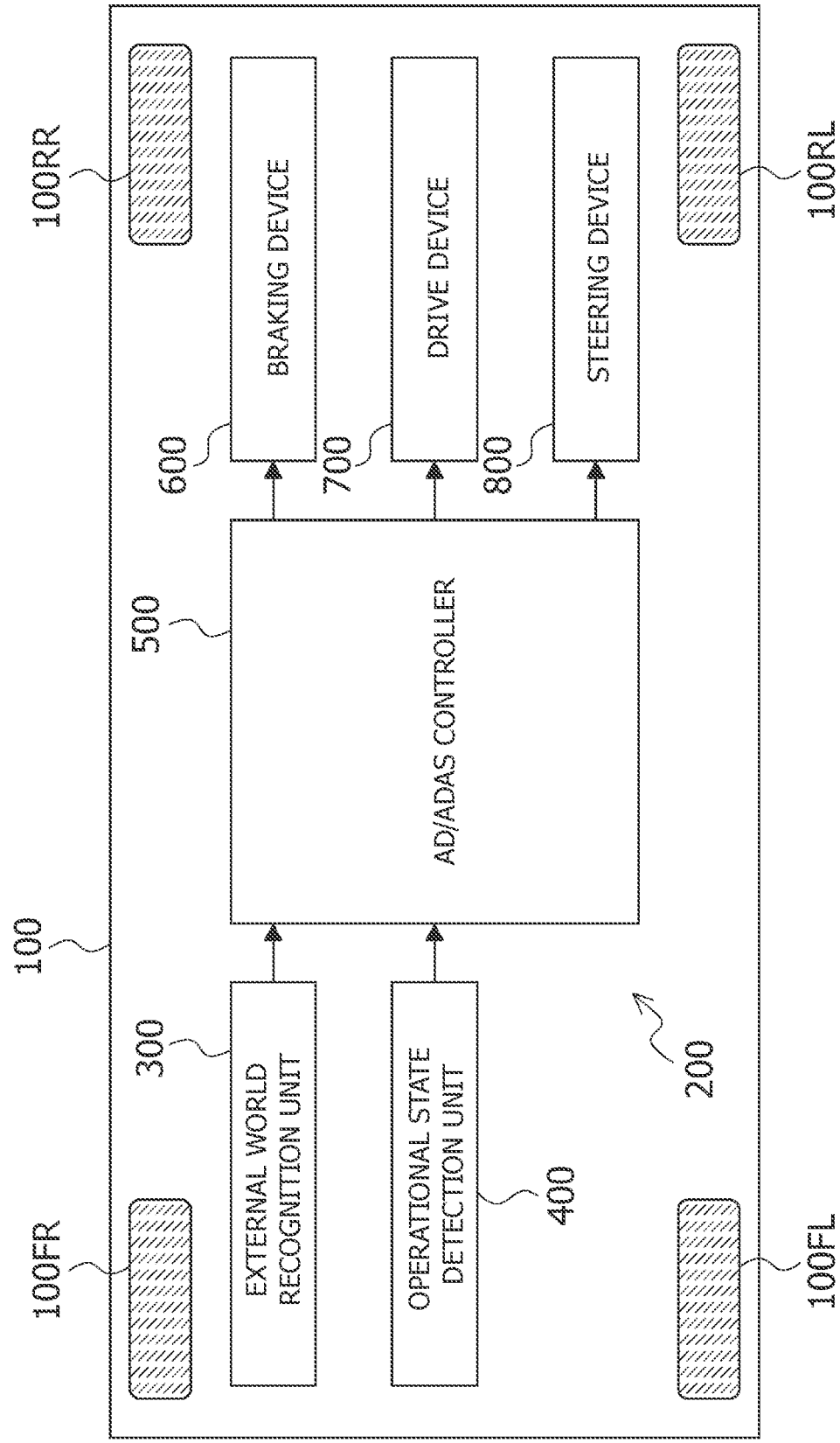
FIG. 21 is a conceptual diagram illustrating a control device and a vehicle using a target trajectory calculation method of the present invention.

FIG. 21 is a conceptual diagram illustrating a vehicle control system including a vehicle control device serving as a control device for performing the target trajectory calculation method according to the present invention, that is, a vehicle control system for performing a vehicle control method according to the present invention, and a vehicle.

A vehicle control system 200 installed in a vehicle 100 includes an external environment recognition unit 300, an driving state detection unit 400, a vehicle control device 500, a braking device 600, a drive device 700, and a steering device 800.

External environment recognition unit 300 includes external environment detection devices such as a laser scanner, a camera, a millimeter-wave radar, and a GPS receiver and acquires external environment information ahead of vehicle 100 on the traveling route of the vehicle 100.

The external environment information includes information on moving objects around vehicle 100 and obstacles that are static objects, in addition to information including white lines on the traveling route of vehicle 100.

Driving state detection unit 400 includes a plurality of sensors for detecting an driving state of vehicle 100, for example, a wheel speed sensor for detecting the rotation speeds of wheels 100FL, 100FR, 100RL, and 100RR of vehicle 100 and an acceleration sensor for detecting a longitudinal acceleration and a lateral acceleration of vehicle 100.

The speed of vehicle 100 can be estimated on the basis of wheel rotation speeds detected by the wheel speed sensor.

Vehicle control device 500 is an AD (Autonomous Driving)/ADAS (Advanced driver-assistance systems) controller of vehicle 100.

Vehicle control device 500 is an electronic control device mainly composed of a microcomputer (in other words, a control section or a control unit) that performs a computation on the basis of input information and outputs an arithmetic result. The microcomputer includes, for example, an MPU (a Microprocessor Unit), a ROM (Read Only Memory), and a RAM (Random Access Memory).

Braking device 600 is a device capable of electronically controlling a braking force of vehicle 100, for example, an electronically controlled electro-hydraulic brake including an actuator for generating an oil pressure.

Drive device 700 is, for example, an internal combustion engine or an electric motor for generating a driving force of vehicle 100 and is a device capable of electronically controlling a driving force of vehicle 100.

Steering device 800 is a device like an electric power steering device or a steer-by-wire system that can electronically control the steering angles of the steering wheels of vehicle 100, specifically, front wheels 100FL and 100FR by means of a steering actuator of an electric motor or the like.

Vehicle control device 500 acquires various types of information from external environment recognition unit 300 and driving state detection unit 400 and generates a target trajectory (in other words, a target position) by using a technique for continuously calculating an offset amount by using the curvature change information on a lane center line ahead of a vehicle.

Vehicle control device 500 then determines a command for a motion of vehicle 100 such that vehicle 100 travels along the generated target trajectory at a set speed, and outputs a control command to braking device 600, drive device 700, and steering device 800 that are actuators for controlling the motions of vehicle 10.

Furthermore, even in the case of a turn with a large steering angle, other vehicles or pedestrians suddenly running out into a road, or a quick turn required to avoid a fallen object on a road, vehicle control device 500 generates a target trajectory according to information sensed by external environment recognition unit 300 and outputs a control command such that the vehicle follows the target trajectory.

If the autonomous vehicle travels on an ordinary road, in addition to traveling with a large turning radius differential and a small turning radius, for example, in narrow and complicated alleys or a parking lot of a shopping center, the vehicle needs to avoid various moving objects including other vehicles and pedestrians and fallen objects or the like in the traveling direction In an operation scene where a turn with a large steering angle or a rapid steering operation is necessary, an actual traveling result may deviate from a target trajectory even if the vehicle is controlled on the basis of sensed information ahead of the vehicle.

Thus, vehicle control device 500 temporarily stores sensing information ahead of a vehicle or waypoint data on the lane center line in internal memory without immediately using the information. The information is used after being corrected by a calculated offset amount, so that points from the past to the present can be recognized as a line (in other words, a trajectory). A target trajectory can be accurately followed by such a configuration.

Moreover, when actuators such as steering device 800 are operated according to the target trajectory, generally, a delay in response from the actuators or the vehicle may reduce the accuracy of trajectory tracking or stability in vehicle control.

Thus, vehicle control device 500 predicts the response of the actuators or the vehicle through a predictive simulation of vehicle motions and makes a correction to a delay in response, thereby enabling further improving the accuracy of trajectory tracking.

The configuration achieved by vehicle control device 500 obtains a target trajectory with an out-in-out line by calculating an offset from the center of a lane according to coordinates at the center of a route, e.g., coordinate point information at the center of the lane, and adding or subtracting the offset to or from a median value. This can improve the ride comfort and maneuverability in autonomous driving along the target trajectory.

The embodiments of the present invention were described for autonomous driving (AD). The target trajectory calculation method is applicable to, for example, advanced driver-assistance systems (ADAS) that issue a warning about departure from a traveling lane and provide lane keeping assistance.

In this case, the quality of warning and intervention can be improved by determining lane departure or lane keeping on the basis of an out-in-out line in addition to a lane center serving as a material for determination.

Furthermore, in the foregoing embodiments, the reference line of the traveling route is, but is not limited to, a lane center line. It is needless to say that the present invention is applicable to any curve serving as a reference line.

The technical ideas described in the foregoing embodiments can be properly used in combination unless a contradiction arises.

The contents of the present invention were specifically described with reference to the preferred embodiments. It is evident that one skilled in the art can adopt various modifications on the basis of the basic technical idea and teachings of the present invention.

REFERENCE SYMBOL LIST

100 Vehicle
200 Vehicle control system
300 External environment recognition unit
400 Driving state detection unit
500 Vehicle control device (AD/ADAS controller)
600 Braking device
700 Drive device
800 Steering device

The invention claimed is:

1. A vehicle control device comprising a control section that outputs a result of a computation based on input information, wherein
the control section
determines an offset amount of a coordinate value or a curvature for each item of basic trajectory coordinate data on a basis of the basic trajectory coordinate data on at least a part or all of a two-dimensional coordinate value, a trajectory curvature, and a trajectory azimuth angle at coordinates arranged in ascending order of arc length from a certain position serving as an origin point,
determines new target trajectory coordinate data by adding the offset amount to each item of the basic trajectory coordinate data, and
controls a trajectory of a vehicle on a basis of the new target trajectory coordinate data, wherein
the basic trajectory coordinate data includes:
first basic trajectory coordinate data having a short arc length from the origin point; and
second basic trajectory coordinate data having a longer arc length than at least the first trajectory coordinate data, and
the control section determines an offset amount of the first basic trajectory coordinate data on a basis of the first basic trajectory coordinate data and the second basic trajectory coordinate data.

2. The vehicle control device according to claim 1, wherein:
the control section
determines an offset amount of the first basic trajectory coordinate data on a basis of a difference between a first curvature corresponding to the first basic trajectory coordinate data and a second curvature corresponding to the second basic trajectory coordinate data.

3. The vehicle control device according to claim 1, wherein:
the control section
determines an offset amount of the first basic trajectory coordinate data rightward with respect to the first basic trajectory coordinate data when a curvature of the second basic trajectory coordinate data increases leftward, and
determines an offset amount of the first basic trajectory coordinate data leftward with respect to the first basic trajectory coordinate data when a curvature of the second basic trajectory coordinate data increases rightward.

4. A vehicle in which is installed the vehicle control device according to claim 1.

5. A vehicle control method performed by a control unit installed in a vehicle, the method comprising:
a step of determining an offset amount of a coordinate value or a curvature for each item of basic trajectory coordinate data on a basis of the basic trajectory coordinate data on at least a part or all of a two-dimensional coordinate value, a trajectory curvature, and a trajectory azimuth angle at coordinates arranged in ascending order of arc length from a certain position serving as an origin point,
a step of determining new target trajectory coordinate data by adding the offset amount to each item of the basic trajectory coordinate data, and
a step of controlling a trajectory of the vehicle on a basis of the new target trajectory coordinate data, wherein
the basic trajectory coordinate data includes:
first basic trajectory coordinate data having a short arc length from the origin point; and
second basic trajectory coordinate data having a longer arc length than at least the first trajectory coordinate data, and
the step of determining the offset amount includes a step of determining an offset amount of the first basic trajectory coordinate data on a basis of the first basic trajectory coordinate data and the second basic trajectory coordinate data.

* * * * *